United States Patent
Butt et al.

(10) Patent No.: US 12,510,626 B2
(45) Date of Patent: Dec. 30, 2025

(54) GROUND PENETRATING RADAR APPARATUS AND METHOD

(71) Applicant: NOVAMERA INC., Oakville (CA)

(72) Inventors: Stephen Douglas Butt, St. John's (CA); Allan Cramm, Baie Verte (CA); Andrew Caruana, Burlington (CA); Yingjian Xiao, Daqing (CN); Li Zijian, St. John's (CA); Jeronimo De Moura, Jr., St. John's (CA); Daniel Altdorff, St. John's (CA); Ramin Rafiei, St. John's (CA)

(73) Assignee: Novamera Inc., Oakville (CA)

( * ) Notice: Subject to any disclaimer, the term of this patent is extended or adjusted under 35 U.S.C. 154(b) by 425 days.

(21) Appl. No.: 17/802,960

(22) PCT Filed: Mar. 1, 2021

(86) PCT No.: PCT/CA2021/050262
§ 371 (c)(1),
(2) Date: Aug. 28, 2022

(87) PCT Pub. No.: WO2021/168591
PCT Pub. Date: Sep. 2, 2021

(65) Prior Publication Data
US 2023/0115265 A1   Apr. 13, 2023

Related U.S. Application Data

(60) Provisional application No. 62/982,991, filed on Feb. 28, 2020.

(51) Int. Cl.
*G01S 7/02* (2006.01)
*G01S 7/03* (2006.01)
*G01S 13/88* (2006.01)

(52) U.S. Cl.
CPC ............... *G01S 7/027* (2021.05); *G01S 7/03* (2013.01); *G01S 13/885* (2013.01)

(58) Field of Classification Search
CPC .......... G01S 7/027; G01S 7/03; G01S 13/885
See application file for complete search history.

(56) References Cited

U.S. PATENT DOCUMENTS

| 2,540,464 A | 2/1951 | Stokes |
| 3,718,930 A | 2/1973 | McCullough et al. |
| (Continued) | | |

FOREIGN PATENT DOCUMENTS

| CN | 202975318 U | * | 6/2013 | |
| EP | 3171197 A2 | * | 5/2017 | ............... G01S 7/03 |
| (Continued) | | | | |

OTHER PUBLICATIONS

European Search Report, EP4111240A1, corresponding to PCT/CA2021/050262, Feb. 24, 2023.
(Continued)

*Primary Examiner* — Vladimir Magloire
(74) *Attorney, Agent, or Firm* — Law Offices of Nisan Steinberg

(57) ABSTRACT

An apparatus for ground penetrating radar includes an antenna disposed within a sleeve. The sleeve includes a radar-absorbing material for attenuating the amplitude of incident radar waves. The sleeve has an aperture for permitting radar waves to pass into and out of the sleeve. A method for surveying a formation using ground penetrating radar includes rotating the antenna and sleeve while keeping the antenna and sleeve longitudinally stationary, and recording data including the amplitude of waves received by the antenna and the position of the aperture when such waves are received.

27 Claims, 18 Drawing Sheets

(56) References Cited

U.S. PATENT DOCUMENTS

| | | |
|---|---|---|
| 3,758,160 A | 9/1973 | Hilton |
| 4,003,017 A | 1/1977 | Bailey |
| 4,280,732 A | 7/1981 | Haspert |
| 4,399,692 A | 8/1983 | Hulsing, II et al. |
| 4,532,544 A | 7/1985 | Federau |
| 4,678,997 A | 7/1987 | Janes |
| 4,779,201 A | 10/1988 | Iizuka et al. |
| 5,325,714 A | 7/1994 | Lende et al. |
| 5,652,617 A | 7/1997 | Barbour |
| 5,984,011 A | 11/1999 | Misselbrook et al. |
| 6,349,778 B1 | 2/2002 | Blair et al. |
| 6,886,644 B2 | 5/2005 | Stump et al. |
| 7,004,263 B2 | 2/2006 | Moriarty et al. |
| 7,013,991 B2 | 3/2006 | Wilson-Langman et al. |
| 7,382,135 B2 | 6/2008 | Li et al. |
| 7,513,318 B2 | 4/2009 | Underwood et al. |
| 8,680,865 B2 | 3/2014 | Zhang et al. |
| 8,694,258 B2 | 4/2014 | Haddad et al. |
| 9,348,020 B2 | 5/2016 | Wilson-Langman et al. |
| 9,810,058 B2 | 11/2017 | Frantzen et al. |
| 10,014,386 B2 | 7/2018 | Posseme et al. |
| 10,541,460 B2 * | 1/2020 | Henry ................. H04B 3/54 |
| 10,858,929 B2 | 12/2020 | Estes et al. |
| 11,495,886 B2 | 11/2022 | Hong et al. |
| 2002/0053471 A1 | 5/2002 | Blair et al. |
| 2004/0104051 A1 | 6/2004 | Moriarty et al. |
| 2005/0140373 A1 | 6/2005 | Li et al. |
| 2006/0113113 A1 | 6/2006 | Underwood et al. |
| 2006/0149477 A1 | 7/2006 | Cairns et al. |
| 2011/0202277 A1 | 8/2011 | Haddad et al. |
| 2011/0227577 A1 | 9/2011 | Zhang et al. |
| 2013/0234879 A1 | 9/2013 | Wilson-Langman et al. |
| 2014/0008059 A1 * | 1/2014 | Macrae ............... E21B 47/26 166/250.01 |
| 2014/0102799 A1 | 4/2014 | Stringer et al. |
| 2015/0053480 A1 * | 2/2015 | Kare .................. G01V 1/166 175/50 |
| 2016/0123096 A1 | 5/2016 | Mathieson et al. |
| 2016/0370491 A1 | 12/2016 | Fechine et al. |
| 2017/0138173 A1 | 5/2017 | Estes et al. |
| 2017/0207317 A1 | 7/2017 | Posseme et al. |
| 2019/0186207 A1 | 6/2019 | Hudson et al. |
| 2019/0207317 A1 | 7/2019 | Hong et al. |
| 2022/0154567 A1 | 5/2022 | Butt et al. |

FOREIGN PATENT DOCUMENTS

| | | | |
|---|---|---|---|
| EP | 3690483 A1 * | 8/2020 | ........ G01S 13/003 |
| GB | 1111629 A | 5/1968 | |
| JP | 2017167063 A * | 9/2017 | |
| JP | 2020072404 A * | 5/2020 | |
| WO | 2005031389 A2 | 4/2005 | |
| WO | 2011100679 A1 | 8/2011 | |
| WO | 2011115646 A1 | 9/2011 | |
| WO | 2013138388 A1 | 9/2013 | |
| WO | 2015030808 A1 | 3/2015 | |
| WO | 2016073436 A1 | 5/2016 | |
| WO | 2020172736 A1 | 9/2020 | |

OTHER PUBLICATIONS

International Search Report and Written Opinion, PCT/CA2021/050262, ISA/CA, Apr. 15, 2021.

Creamer, Martin, "Revolutionary gold-mining machine making progress-AngloGold," downloaded Oct. 10, 2019 from: www.miningweekly.com/article/revolutionary-gold-mining-machine-making-progress-anglogold-2016-08-15 (Aug. 15, 2016).

Hoefinghoff, Jan-Florian et al., "Resistive Loaded Antenna for Ground Penetrating Radar Inside a Bottom Hole Assembly," IEEE Transactions on Antennas and Propagation, vol. 61, No. 12, pp. 6201-6205, Dec. 2013.

* cited by examiner

GROUND PENETRATING RADAR APPARATUS AND METHOD

CROSS-REFERENCE TO AND BENEFIT OF EARLIER APPLICATIONS

This is a U.S. national phase application under 35 U.S.C. § 371 of United States Patent Cooperation Treaty Application No. PCT/CA2021/050262, filed Mar. 1, 2021, which claims priority from U.S. Provisional Patent Application Ser. No. 62/982,991, filed in the United States Patent and Trademark Office on Feb. 28, 2020, and this national phase application incorporates by reference those PCT and Provisional applications in their entireties.

TECHNICAL FIELD

The present invention relates to ground penetrating radar and methods for using same.

BACKGROUND

In various mining and petroleum recovery operations, boreholes are drilled by rotating a drill bit attached at the end of a drilling assembly generally called the "bottom hole assembly" or the "drilling assembly". The borehole path is carefully planned before drilling such boreholes using seismic maps of the earth's subsurface and data from previously drilled boreholes. Due to the very high cost of drilling such boreholes and the need to place such boreholes in the reservoirs, ore bodies and similar subsurface features accurately, it is important to determine the position and direction of the drilling assembly and thus the drill bit during drilling of the boreholes. Such information is used, among other things, to monitor and adjust the drilling direction of the boreholes.

In drilling assemblies used until recently, the directional package commonly includes survey instruments such as accelerometers, magnetometers and gyroscopes, which respectively measure the earth's gravity and magnetic field. The toolface and the inclination angle are determined from the accelerometer measurements. The azimuth is then determined from the magnetometer and gyroscope measurements in conjunction with the tool face and inclination angle.

Drilling assemblies may include an antenna used to emit electromagnetic waves and receive echoes of the electromagnetic waves off objects beneath the earth's surface and outside of the drilling assembly. These objects can include mineral deposits (e.g., coal or other ore sought to be removed from the earth), interfaces between mineral deposits and other materials, interface between gas deposits and surrounding materials, etc.

SUMMARY OF INVENTION

In accordance with a broad aspect of the present invention, there is provided an apparatus for ground penetrating radar, comprising: a sleeve for absorbing radar waves, the sleeve including a body that is elongate, hollow, and cylindrical, the body having an interior cavity for accommodating an antenna, the body including a radar-absorbent material; and an aperture, free of radar-absorbent material, extending along an axis of the sleeve for permitting radar waves to pass into and out of the sleeve.

In accordance with another broad aspect of the present invention, there is provided a method for configuring a radar imaging apparatus to support directional data capture, the method comprising: positioning a sleeve around the radar apparatus, the sleeve including a wall configured to absorb radar waves and including an aperture through the wall for permitting radar waves to pass through.

In accordance with yet another broad aspect of the present invention, there is provided a method for surveying a formation using ground penetrating radar, comprising: positioning a directionally configured antenna in a borehole; rotating the directionally configured antenna about a long axis of the directionally configured antenna; maintaining the directionally configured antenna longitudinally stationary; emitting waves from the directionally configured antenna; receiving waves via the directionally configured antenna; and recording data, including amplitude data of waves received by the directionally configured antenna, and position data of a rotational position of the directionally configured antenna.

In accordance with yet another broad aspect of the present invention, there is provided an apparatus for ground penetrating radar, comprising: an antenna assembly including a sleeve for absorbing radar waves, the sleeve including a body that is elongate, hollow, and cylindrical, the body having an interior cavity, the body including a radar-absorbent material, and an aperture extending along an axis of the sleeve for permitting radar waves to pass into and out of the sleeve; an antenna disposed within the body of the sleeve, the antenna being for transmitting and receiving radar waves; at least one survey instrument coupled to the antenna assembly, the at least one survey instrument being for determining an orientation of the aperture in space; and a latching assembly for latching the apparatus to a drill string; and the antenna assembly, the at least one survey instrument, and the latching assembly being coupled into an elongate structure.

It is to be understood that other aspects of the present invention will become readily apparent to those skilled in the art from the following detailed description, wherein various embodiments of the invention are shown and described by way of illustration. As will be realized, the invention is capable of other and different embodiments and its several details are capable of modification in various other respects, all within the present invention. Furthermore, the various embodiments described may be combined, mutatis mutandis, with other embodiments described herein. Accordingly, the drawings and detailed description are to be regarded as illustrative in nature and not as restrictive.

BRIEF DESCRIPTION OF THE DRAWINGS

Referring to the drawings, several aspects of the present invention are illustrated by way of example, and not by way of limitation, in detail in the figures, wherein:

(e) FIG. 4D is a section along line A-A of FIG. 4C;

DETAILED DESCRIPTION OF EMBODIMENTS

The detailed description set forth below in connection with the appended drawings is intended as a description of various embodiments of the present invention and is not intended to represent the only embodiments contemplated by the inventor. The detailed description includes specific details for the purpose of providing a comprehensive understanding of the present invention. However, it will be apparent to those skilled in the art that the present invention may be practiced without these specific details.

Typically, non-directional radar antenna are used for borehole applications. One reason for this is directional radar antenna on the market are substantially larger in diameter and more costly than non-directional radar antenna. Historically, multiple (for example, three) boreholes would be drilled and non-directional radar data collected from each of such boreholes can be used in combination to approximate the location of objects detected from each borehole.

Figure 1A:
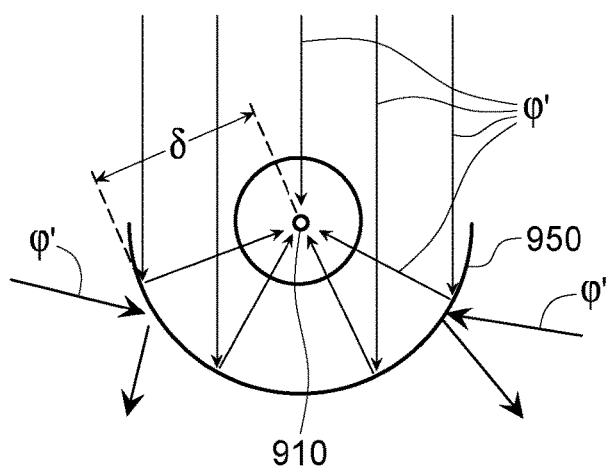
FIGS. 1A and 1B are schematic illustrations for explaining the action of a reflector on antenna directionality.
Figure 1B:
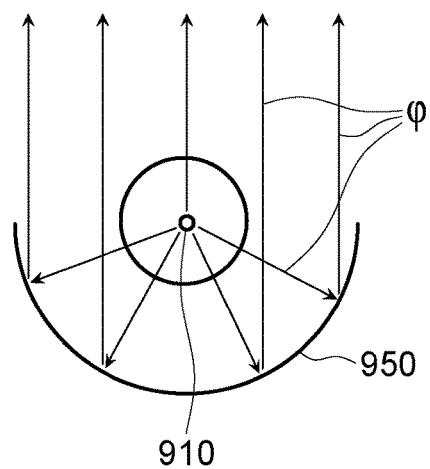

With reference to FIGS. 1A and 1B, one method used to configure a non-directional radar antenna 910 to be capable of capturing directional data is to partially surround the antenna 910 with a reflective shield 950. The reflective shield focuses the transmitted waves ψ and received waves ψ' in a selected direction by reflecting away waves from unwanted directions. The reflective shield is typically made of a conductive material, such as metal (for example, steel). The reflective shield must be approximately a distance δ of one quarter wavelength from the centre of the antenna. At this distance, the reflected waves are in phase with the incident waves and the waves constructively interfere and increase the overall wave amplitude. At smaller distances, the reflected waves are out of phase with the incident waves, resulting in destructive interference, noise, ringing, etc., thereby obscuring the desired waves. In other words, there is a minimum space requirement, which varies depending on the wavelength emitted by the antenna, for this method to provide the desired utility. This has at least two disadvantages: first, the distance required between the shield and the antenna limits the ability to use longer wavelengths and/or adjust the wavelengths emitted by the antenna; second, this distance occupies too much space for downhole applications in general, and integration with drill strings on the market in particular. For example, for a 100 MHz antenna, distance δ would be between 25 cm and 38 cm, whereas diamond drill holes are generally between 3.5 cm and 5 cm in radius. In another example, for a 500 MHz antenna, distance δ would be between 5 cm and 7.5 cm. While the latter antenna and shield assembly may fit downhole, the distance δ being at least 5 cm would preclude many methods for downhole deployment of the antenna and shield assembly, such as wireline tool deployment through a drill string. Operation of the antenna and shield assembly wherein the assembly protrudes from an open end of the core barrel of the drill string would also not be feasible, and therefore the antenna would not be capable of generating images axially ahead of the drill string.

Therefore, there is a demand for an apparatus and method to configure a non-directional radar antenna apparatus to be capable of capturing directional data in downhole conditions.

A drilling assembly may include an antenna used to emit electromagnetic waves and obtain echoes of the electromagnetic waves off objects beneath the earth's surface and outside of the drilling assembly. The antenna may be a ground penetrating radar antenna, in particular a non-directional ground penetrating radar antenna such an omnidirectional radar antenna, technically known as a dipole antenna, or a weakly directional antenna such as a bowtie antenna (for example Geoscanners BA-500™ bowtie antenna or the Slimhole™ borehole antenna from MALA), and the like. There may be one or more of various computer components coupled to the antenna, such as any one or more of a processor and a storage medium. The antenna may generate data, such as data about the waves it transmits and receives. Such data may be recorded to a storage medium or may be transmitted to surface.

Figure 2:
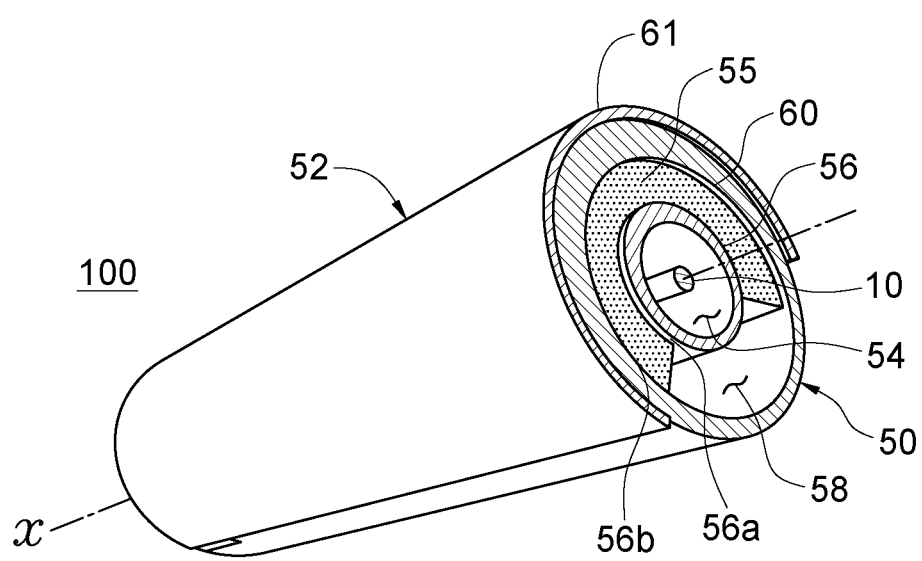
FIG. 2 is an orthogonal section relative to the long axis $\chi$ of an antenna apparatus according to one embodiment of the invention.

With reference to FIG. 2, an apparatus 100 for ground penetrating radar may include an antenna 10 and a sleeve 50 to permit a reconfiguration of the antenna to enable it to collect data that may be processed into directional images of the environment. The sleeve provides directionality to the omnidirectional (e.g., dipole) antenna and tunes the inherent directionality in directional antennas (e.g., bowtie antennas).

Figure 3A:
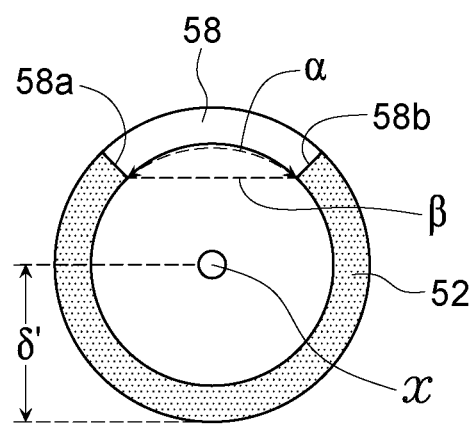
FIG. 3A to 3C are schematic illustrations of end views of an antenna directional sleeve according to an embodiment of the invention.
Figure 3B:
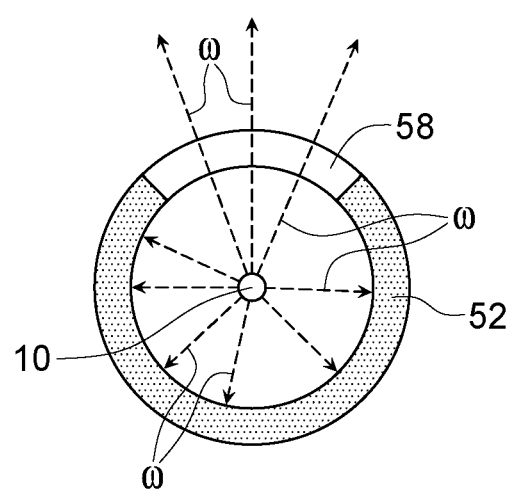
Figure 3C:
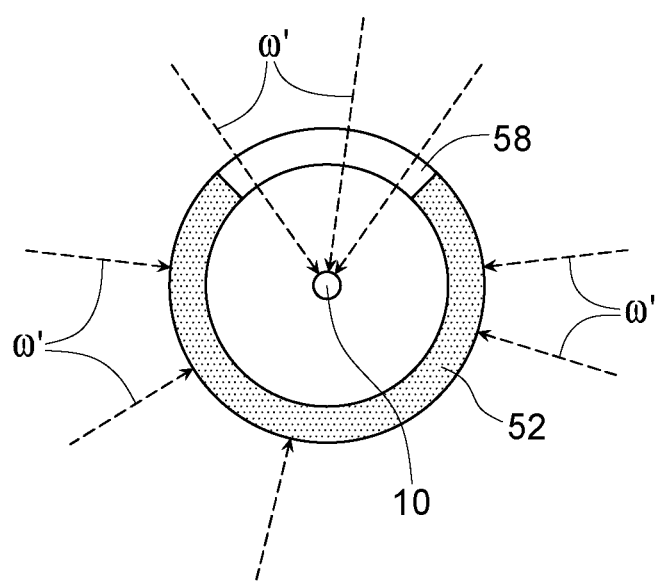

With reference to FIGS. 3B and 3C, the antenna transmits waves ω and receives echoes ω' of some of the waves ω after the waves reflect off objects of the environment. The antenna may have a receiver portion for receiving waves ω' and a transmitter portion for transmitting waves ω. The receiver portion and transmitter portion may be positioned in line, for example, the transmitter portion at one end and the receiver portion at another end of the antenna's elongate body, in one embodiment. In one aspect, for example on the transmitter portion, the sleeve is used to control the direction in which waves ω are emitted, as further described below. In another aspect, for example on the receiver portion, the sleeve is used to prevent waves ω' approaching from an unwanted direction from reaching the antenna, as further described below.

Figure 4A:
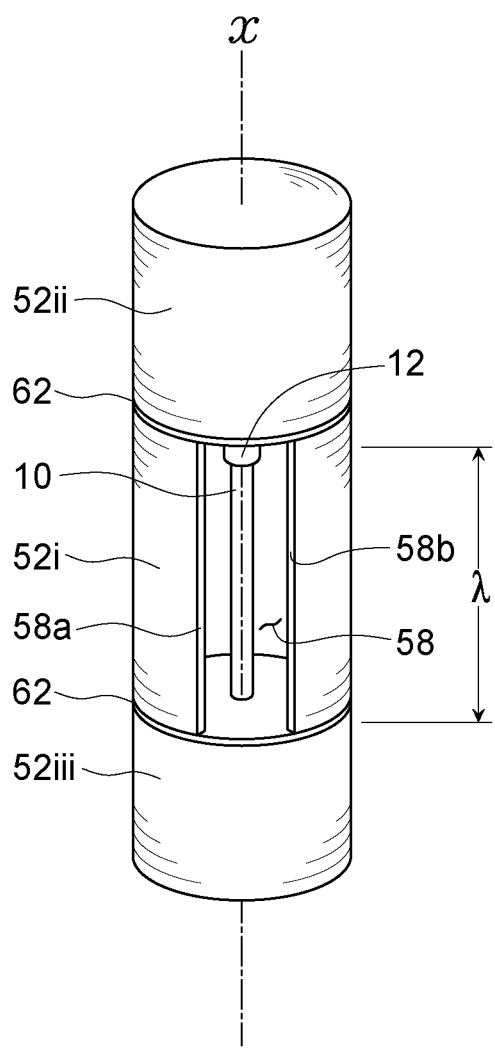
FIG. 4A is a schematic isometric view of another embodiment of an antenna apparatus.

Sleeve 50 accommodates the antenna therein and includes a wall portion including a radar-absorbent material and an aperture on the wall that is free of radar-absorbent material so that waves transmitted from the antenna and passing through the sleeve become directional: attenuated where they pass through the wall but unaffected where they pass through the aperture. In particular, sleeve 50 may have a body 52 that is elongate, hollow, and cylindrical. The body wall 56 surrounds the hollow interior cavity 54 of sleeve 50. The antenna may be accommodated within the hollow interior cavity, for example aligned along, with its diameter concentric with, a long axis χ of the sleeve. As illustrated in FIG. 4A, the sleeve may include a coupling 12 for removable connection with the antenna. The coupling may be a threaded connection for threading onto a portion of the antenna. The sleeve may be replaced, e.g., for wear and tear, to vary the configuration of the sleeve, for maintenance, etc. Aspects of the sleeve may be selected according to the given application's environment.

The body may include a radar-absorbent material 60 for absorbing unwanted waves ω and ω'. Radar-absorbent material is commonly referred to as "RAM". RAM is material that absorbs incident radar waves. For example, RAM may be made of a lossy material. To be lossy, the material may be neither a good electrical conductor nor a good electrical insulator, as neither type absorbs power. It is believed that radar waves, coming into contact with the RAM, induce molecular oscillations from the alternating magnetic field in the material, which may lead to conversion of the radar energy into heat.

The more effective the RAM, the lower the resulting amplitude of the transmitted or received radar signals passing therethrough. Suitable RAM materials 60 are those that generate at least a 50% amplitude reduction in EMI. Stated another way, the material may have a transmission loss, absorption rating of at least −3 decibels. The RAM is not reflective to the electromagnetic radar waves, but rather dissipates their energy. Therefore, RAM is not a solid metal or other reflective material. The RAM reflects fewer if any of the waves transmitted by the antenna than would a reflective material, such as solid metal or metal alloys.

Examples of radar-absorbent materials include any one or more of carbon, such as activated carbon, carbon nanotubes or graphite particles, or materials impregnated with carbon particles, carbonyl iron particles or ferrite particles. The use of iron, ferrite-containing materials should be used with care, as the ferrite may create problematic interference with the antenna. In addition to the particulate carbon materials noted, examples of exemplary radar-absorbent materials, combine a resilient, elastomeric characteristic with the particulate carbon or ferrite. Examples include: particulate carbon materials, urethane such as rubberized urethane foam impregnated with carbon or ferrite particles, neoprene with ferrite grains or carbon particles embedded in the polymer matrix or silicone rubber with impregnated carbon or ferrite particles. The materials can be obtained in sheet form, so that they are easy to size and apply. Some suitable materials include: the low frequency absorber MR51™ available from MAST Industries Inc., which is described as a silicone-based product with shaped magnetic particles; ARC Technology, Inc. WX-A™ Series, which is an elastomeric sheet believed to be urethane-based; or the MAB-03™ EMI absorber product from KGS Kitagawa Industries America, Inc., which is a ferrite-impregnated elastomeric sheet. Some suppliers keep the absorber composition as proprietary.

In one embodiment, the RAM is in particulate form. To contain the particulate, the body 52 may include an annular cavity 55 formed between an inner cylindrical wall 56a and an outer cylindrical wall 56b. The RAM particulate 60 may be contained in the cavity between walls 56a, 56b. The material of walls 56a, 56b may be radar transmissive. Alternatively or in addition, the body may support a solid RAM or itself may be made of RAM. For example, RAM materials that are available in sheets, may have a flexibility to be wrapped into a cylinder to construct, overlie or line the body wall 56. In one embodiment, for example, the flexible sheet material can form the sleeve wall by being wrapped and coupled directly onto the outer surface of the antenna.

In one embodiment, the sleeve may include a metal reflector layer 61 in addition to the radar-absorbent material. The metal reflector layer may for example be a thin metal coating or sheet such as for example aluminum foil or sheet steel. The metal reflector may be positioned outwardly of the RAM material, for example about ¼ wavelength away from the antenna. If the apparatus 100 cannot have a diameter that permits the metal reflector to be more ¼ wavelength away from the antenna, then the metal reflector should not be used. In one embodiment, the metal reflector layer is used on the transmitting antenna.

With reference to FIG. 2, the sleeve also has an aperture 58 extending parallel to long axis χ of the sleeve. In use, aperture 58 allows waves ω transmitted by antenna 10 to emit radially beyond sleeve 50, and allows waves ω' to reach the antenna. In other words, the aperture permits waves ω pass into and out of the sleeve without passing through the RAM material 60 or reflector 61. The aperture may be defined by a gap in the sleeve. In other words, the aperture may be a hole in the sleeve. That is, the body may define a circumference of the sleeve, and a hole in that circumference may define the aperture. Alternatively, as shown in FIG. 2, the aperture may be an area in the wall where there is an absence of RAM. For example, the sleeve may have an area that is devoid of RAM, which defines the aperture. For example, aperture 58 may be defined by air space or may be filled by a spacer positioned within the sleeve. The spacer may be a non-radar-absorbent material (which may be referred to as a radar transmissive material), such as foam (for example, polyethylene foam). An example of a radar transmissive material is dielectric or other material that allows passage of waves therethrough, such as a polyethylene, polyamide, acrylonitrile butadiene styrene (ABS) or other polymers. Whether the aperture is a hole, an air space, or a filled area, the side-to-side limit, or width, of the aperture, is defined between RAM materials on either side. As shown in FIG. 3A, the aperture may be measured by an arc length a on the circumference of the sleeve between two sides 58a and 58b of the aperture, and alternatively or in addition, the aperture may be measured by the length of a chord β of the end points of the aperture on the circumference of the sleeve. In one embodiment, the aperture extends, in other words has an arc length α, up to 180°, for example extending from between 10° and 180° relative to long axis χ around the circumference of the sleeve. If the antenna is an omnidirectional antenna, it can be secured at any rotational orientation within the sleeve. If the antenna has inherent directional characteristics, it should be oriented to transmit or receive towards the aperture. For example, a bowtie antenna should have its direction of highest sensitivity oriented at generally the centre of the aperture.

With reference to FIG. 4A, the aperture may extend a length λ in an axial direction parallel to the long axis χ, at least a portion, and possibly the entirety, of the axial length of the sleeve. For example, in one embodiment, the sleeve may include a first axial length 52i with an aperture 58 defined between sides 58a, 58b and including RAM, as described above, that creates the tubular walls of the first axial length apart from the area of aperture and a second axial length 52ii that has no RAM, but functions as a non-absorbent spacer to maintain the structure of the assembly. Alternatively, second axial length may have RAM disposed about substantially the entire circumference of the sleeve to completely block radar wave transmission therethrough. The sleeve may also include a third axial length 52*iii* similar to the second axial length, and the sleeve may be configured such that the first axial length and the aperture may be axially between the second and third lengths. The axial lengths may be releasably connectable with each other, for example via one or more couplings 62. If the location or dimensions of the aperture cannot be appreciated from the exterior of the sleeve, a visible indicator may be positioned on an exterior of the sleeve to indicate an axial position, an arc length of the aperture, or both, of the aperture within the sleeve. In one embodiment, the second and third axial lengths may be made of a material that is not RAM. In such an embodiment, the second and third lengths may provide a consistent cylindrical shape as the first axial length, however, the material will not necessarily absorb waves.

In an embodiment with multiple axial lengths, all lengths may be the same or one or more lengths may have its own configuration. For example, each length may have a different sized aperture compared to the other lengths. Some of the lengths may have no aperture; however, at least one length has an aperture. Each length may have a different RAM, or no RAM; however, at least one length includes RAM. The couplings may allow different configurations of the sleeve with respect to the antenna. For example, the transmitter portion of the antenna may be surrounded by one length, and another length of the sleeve with the same or different aperture, RAM material content, etc. may be connected to the first length and surround the receiver portion of the antenna. This permits the impacts of the sleeve, the way in which the waves are transmitted and received into and out of the sleeve, to be uniquely selected for each of the receiver and the transmitter.

Figure 4B:
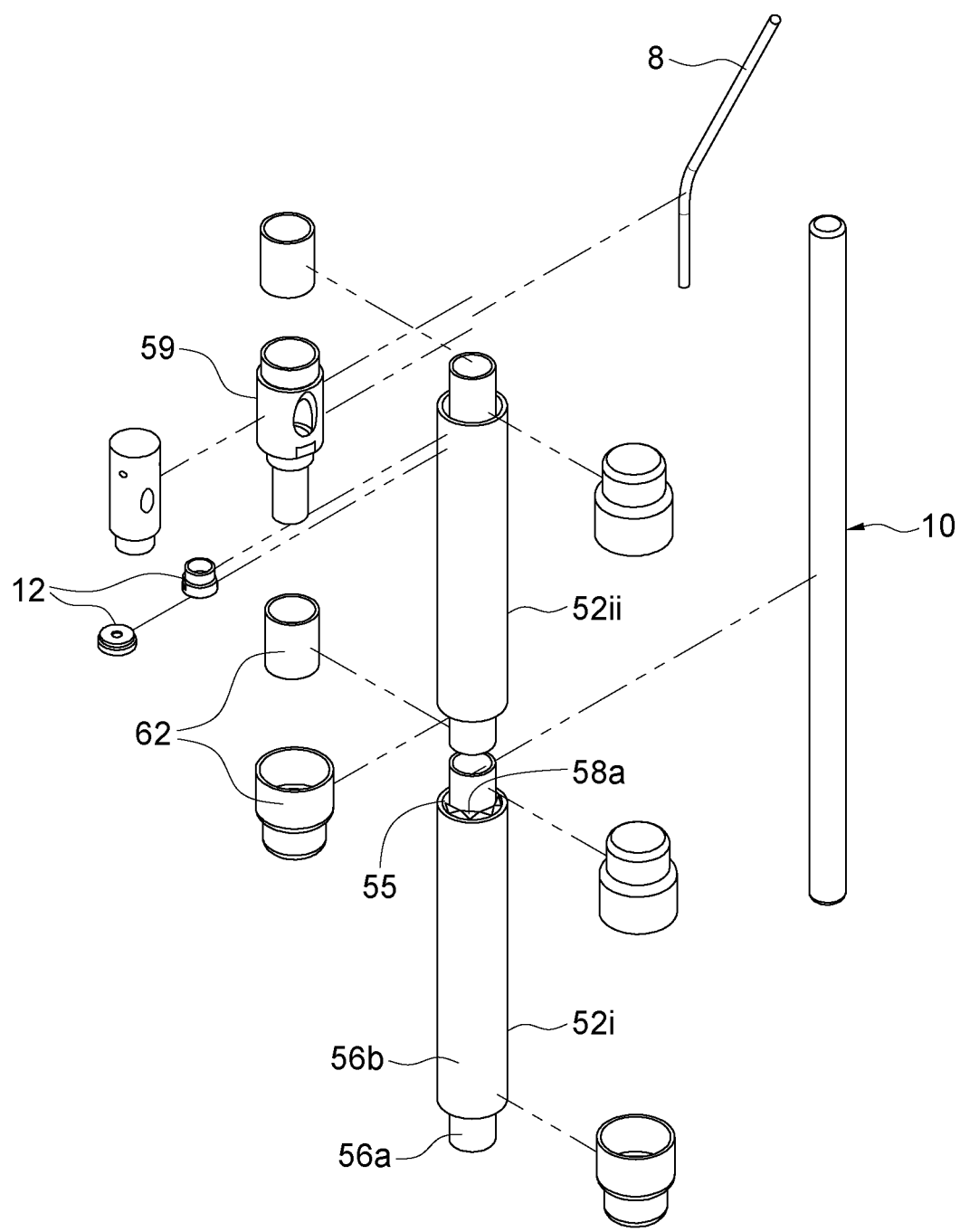
FIGS. 4B to 4D are exploded-isometric, side elevation and long sectional views, respectively, of another antenna apparatus, and specifically.
Figure 4C:
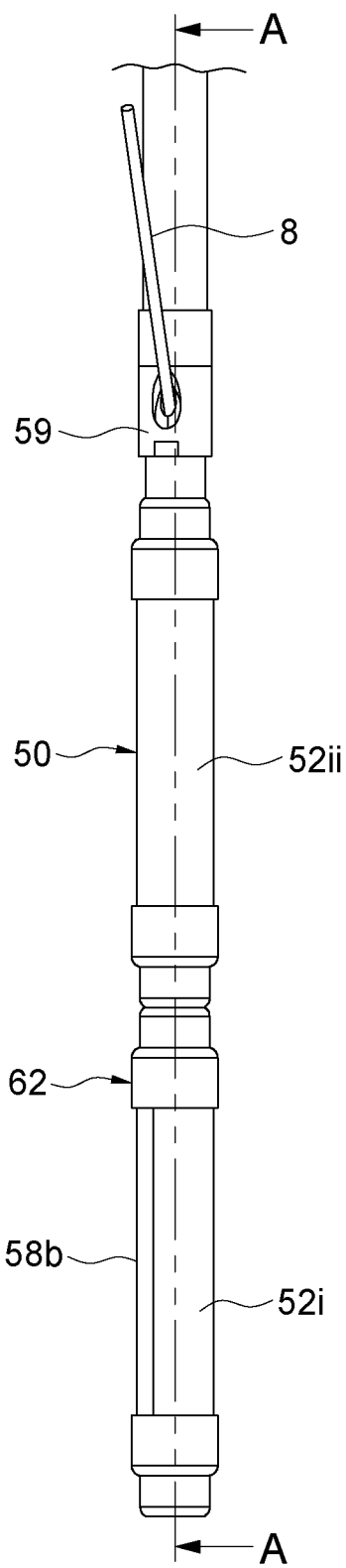
Figure 4D:
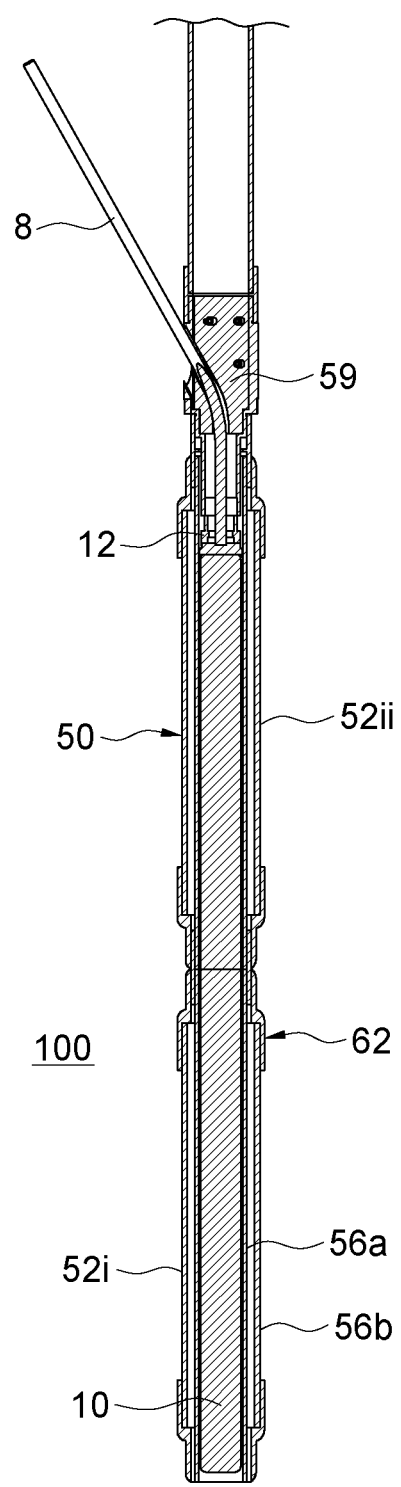

With reference also to FIGS. 4B-4D, another embodiment of apparatus 100 including an antenna 10 and a sleeve 50 is shown. In one embodiment, the antenna 10 includes a transmitter portion at the very distal end of the apparatus. The antenna's receiver portion is at the upper end of apparatus 100, which is the end including a connector 59 or upper end cap of the sleeve. Connector 59 may be durable and configured for rigid, but releasable connection to other components of a tool. Connector 59 may also include a port and components for handling passage of the antenna's power/communication cable 8. The lower end of the sleeve is capped. There may also be a coupling 12 at the upper end of the apparatus for securing the antenna within the sleeve's inner diameter. Additionally or alternatively, the apparatus may communicate wirelessly via a wireless communications apparatus.

A lower length sleeve portion 52*i* is positioned around the transmitter portion of the antenna and an upper length sleeve portion 52*ii* is installed around the receiver portion of the antenna. While the lower length sleeve portion and the upper length sleeve portion can each be configured in various ways, as an example, sleeve portion 52*i* can have radar-absorbent material in, on or forming its wall and an aperture, indicated by 58*a*, 58*b*, without radar-absorbent material. In addition, the sleeve portion 52*i* includes a reflective material coating radially outwardly of the radar-absorbent material, for example coating the outer surface of the lower length sleeve portion except in the area of the aperture. The lower length sleeve therefore configures the antenna with directionality, since wall portions of portion 52*i* that contain the radar-absorbent materials attenuate any radar waves directed therethrough while the radar waves can readily pass through the area of the aperture. Greatest directionality is seen when the RAM and the reflective material coating is used on the transmitting antenna—this further limits the amplitudes of transmitted radar waves in the non-aperture direction. However, the apparatus can be configured with the absorbent cover on the transmitter only, the receiver only or on both depending on the best performance for the imaging conditions.

Further, in this exemplary embodiment, the length of upper portion 52*ii* of the sleeve, which is that around the receiver portion, has no radar-absorbent material such that the radar waves can freely pass through the sleeve wall. There is a durable but releasable, such as threaded, coupling 62 between the lower length and the upper length of the sleeve.

In one embodiment, each of the upper length and the lower length, are constructed of a polymeric pipe, such as of ABS plastic. The polymeric pipe along upper length is continuous and encloses and protects the antenna therewithin. The lower length of the sleeve, however, includes the radar-absorbent material. While many constructions are possible, in this illustrated embodiment, the lower length is double walled with a smaller diameter ABS pipe 56*a* within an outer pipe 56*b*, thereby forming an annular chamber 55 therebetween. A wedge-shaped, elongate non-radar-absorbent (for example polyethylene) foam spacer 58*a*, that is a lengthwise section of a cylinder, is installed between the walls occluding a lengthwise portion of the annular chamber, while the remainder of the annular chamber is filled with radar-absorbent material, such as for example, particulate activated carbon or another RAM material, as described above. The annular chamber 55 has a radial dimension, from pipe 56*a* to pipe 56*b*, of approximately 2 mm to 6 mm and the foam spacer can have a similar face to backside thickness to fill the radial dimension of the annular chamber. In addition, spacer 58*a* has a side to side dimension that defines an aperture size, arc length, of 10° to 180°. As such, the elongate non-RAM foam spacer 58*a* creates the aperture along the sleeve, which is an area through which the antenna radar waves can pass without adsorptive dissipation thereof. In this embodiment, the aperture is not an opening, but instead an area of the wall within pipe 56*b* that does not contain RAM and therefore is transmissive to the radar waves, while the remainder of the circumference of the lower length of the sleeve is RAM-containing and thereby absorbs and attenuates radar waves as they pass therethrough. There may be a number of replacement sleeve lower lengths, each with a different arc length of foam spacer or a different type or thickness of radar-absorbent material. Each sleeve lower length may have an indicator such as a stripe 58*b* on its outer surface to show the location and size of its aperture. Additionally or alternatively, the indicator may comprise a notch and/or other marking.

The arc length may be selected to control the direction of waves emitted and received by the antenna. For example, a larger arc length, compared to a relatively smaller arc length, will permit the antenna to emit waves out of the sleeve in a greater spectrum of radial directions. Similarly, a larger arc length, compared to a relatively smaller arc length, will permit the antenna to receive waves from out of the sleeve in a greater spectrum of radial directions. Accordingly, it is appreciated that varying the arc length of the aperture may allow the waves transmitted or received to be focused. Adjusting the aperture may also be useful, for example, to accommodate different wavelengths transmitted and received by the antenna.

Figure 5:
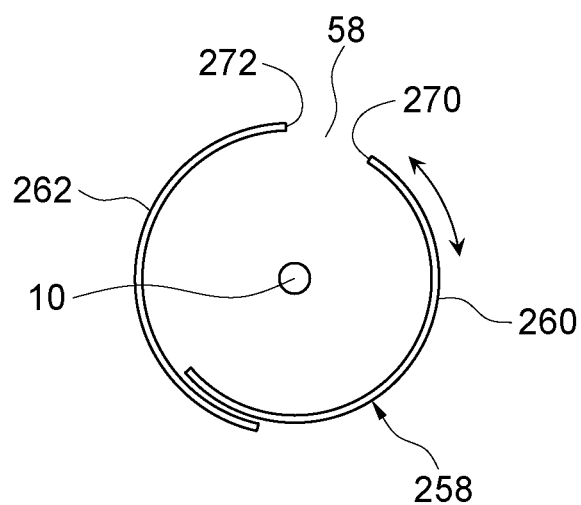
FIG. 5 is a schematic end view of an antenna directional sleeve according to an embodiment of the invention.

Thus, it may be useful to have a number of different sleeves with different aperture arc lengths. Alternatively, the aperture on any one sleeve may be adjustable. With reference to FIG. 5, in one embodiment, the sleeve 258 may have a shutter construction. The shutter construction includes a first shutter 260 and a tubular wall 262 or second shutter. Each shutter has a c shape in orthogonal cross section relative to the long axis of the body. Each shutter may be substantially coaxial with the other. The first shutter may be rotatable about its axis relative to the tubular wall or second shutter, such that the aperture 58 is defined by an adjustable space between a first edge 270 of the first shutter and a second edge 272 of the tubular wall or second shutter. One or both of the shutters may be coupled to a rotatable driver to so rotate the shutter or shutters by actuating the driver. The driver may be controlled by the operator or through control logic.

In addition to adjusting the aperture size, selecting the wavelengths may be useful to obtain images at different distances from the antenna. For example, compared to any given wavelength, relatively longer wavelengths will generally penetrate further in distance, but will provide a lower-resolution image.

The speed of rotation, wavelengths, and/or aperture may be adjusted manually by an operator and/or automatically by the processor. The processor may implement machine learning methods to analyze images and adjust the wavelength and/or aperture size to obtain improved and/or different images.

The sleeve may be coupled to one or more survey instruments. For example, the survey instruments may be for measuring movement and/or an orientation of the apparatus, possibly including movement and/or orientation of the aperture relative to the axis of the sleeve. In one embodiment, the survey instruments include one or more of a gyroscope, an accelerometer and a magnetometer for measuring one or more of movement, azimuth, pitch, and roll.

The antenna and sleeve may be used to detect the direction of an interface or body of interest in the formation around the borehole where the apparatus is operating. To detect and delineate interfaces and bodies of interest, and describe their actual position in space, it is important to register reflected energy along a particular direction. However, depending on the geological environment being imaged, different sleeve configurations may be required to optimally register the reflection. The variation of the effective beam aperture, for example by employing different sleeves, influences the total power radiated by the antenna. In general, a narrow aperture has a larger attenuative effect on the radiated energy of the antenna, compared to a wider aperture. This might not be important in a geological environment where the contrast of electrical properties is high since we could expect most of the energy (or a significant part of it) to be reflected back to the recording sensors in a monostatic system. On the other hand, when the target is surrounded by a lossy medium or the transition between layers exhibits low contrast in electrical properties, most of the energy is absorbed or dissipated. This may pose a problem for common-offset surveys where reflected waves are the most important recorded data. If the aperture is too narrow, the reflected signature of the target might be buried under low signal-to-noise data. In particular, the transmitted or received signal is too weak by the time it is recorded by the receiving antenna that it can't be distinguished from the noise level. The use of a narrow aperture further complicates the identification of the target due to the higher attenuative effect narrower beams have on the transmitted pulse. For such applications, a wider aperture is necessary to identify the target. Thus, the method of using the apparatus may include selecting the aperture of the sleeve, and possibly other aspects of the sleeve, based on the electrical properties of the formation and target.

One method of varying the configuration of the sleeve is by physically changing the sleeve used and installed on the antenna transmitter and/or receiver. In one embodiment, the tool may be deployed and data may be collected to produce an image to identify objects or delineated interfaces. Based on the resultant reflected image, a decision can be made to change the sleeve with that containing a different type or thickness of absorbent material, or with an added reflective layer. Additionally or alternatively, the decision to change the aperture of the sleeve can be made. This decision is based on the quality of data received and the geological characteristics producing the reflections at the interface.

A second method of varying the configuration of the sleeve uses automatic computation and processing. With a processor onboard coupled to the sleeve and antenna assembly, automated decisions can be made about the aperture opening. This is done by comparing data of a single image or multiple images taken with different apertures. Using this information, the processor can determine the aperture position best to identify the delineation interface location.

The processor may control the width of the aperture. For example, the aperture's arc length may be set to a starting position such as 180°, or narrower, such as 10°. The antenna and sleeve may be rotated 360°, during which the antenna transmits and receives signals, and data about such signals are recorded, for example to the storage medium. The data are then processed.

Processing the data can include any one or more of the following operations: dewowing the data, filtering the data, gaining the data, and converting amplitudes of waves to positive values. Processing the data can also include identifying anomalies; for example, the data can be analyzed to identify a signal-to-noise ratio of the data.

If, during the processing step, anomalies are detected in the data, the aperture's arc length may be either increased or decreased. To facilitate description we will describe a situation where the aperture has a wide arc length, for example of 180°. In such a situation, if anomalies are detected in the data, the aperture's arc length may be decreased, for example by 1°, and the steps for rotating the antenna and sleeve, recording data, and processing data may be repeated. Each time data are processed, the data may be compared to previously processed data. Following the processing of the data, the processor can determine whether changes should be made to the configuration of the apparatus.

The processor and/or operator may be informed by information about the given application. For example, the processor may be pre-programmed with information about the formation being surveyed, and the processor may take such information into account as part of its decision-making instructions. In one embodiment, the processor may calculate, based on the data collected and processed, whether the aperture's arc length should be increased, decreased, or whether the data already collected are sufficient to use to generate a reliable radargram and therefore no further data are required.

Frequency of a wave is directly proportional to wavenumber, and inversely proportional to wavelength. Wave frequency has a strong impact on penetration depth and resolution of the image output. High wavenumbers in the medium (short wavelengths) generate images with higher resolution since more waves are "illuminating" a given distance. However, high-wavenumber signals (which contain high frequencies) are more rapidly attenuated due to energy loss processes involving heat conversion, energy partitioning, geometrical spreading, scattering, etc. These processes have a greater effect on high frequencies than on low frequencies. Therefore, low-frequency signals are relatively less attenuated and, therefore, can travel relatively longer distances before experiencing significant amplitude decay. Note that images generated from low-frequency signals have a lower resolution because fewer waves "illuminate" the medium. In other words, compared to waves with relatively short wavelengths, waves with relatively long wavelengths can penetrate deeper, but have a reduced ability to discriminate between two separate features.

The sleeve and antenna assembly described herein, and its associated method, is suitable for detecting targets at various locations from the borehole axis. The tool can be adapted in such a way that different ranges of depth can be imaged. By using waves in the ultra-high frequency (UHF) range (i.e., between 300 MHz and 1 GHz), high-resolution images near the borehole may be generated. These images are used to detect signal anomalies corresponding to desired targets. However, when targets are farther away from the borehole axis, waves in the very high frequency (VHF) range (i.e., between 30 MHz and 300 MHz) may be used. Although the resolution is somewhat compromised, the lower-frequency waves can allow the antenna to detect changes in electrical properties around the borehole covering a larger investigation depth of, for example, about 3-4 times the investigation depth associated with the higher-frequency waves. Thus, scanning in the VHF and UHF ranges yields high-quality and high-confidence radial images around the borehole axis with various investigation depths. This functionality not only decreases drilling risks by imaging the vicinity of the borehole and staying away from the vein boundaries, but it also maximizes the ability to evaluate a larger space in a reconnaissance or explorative manner.

The frequency of the antenna may also be varied. For example, the physical antenna may be changed for another antenna that is tuned to the desired frequency. In one embodiment, the tool may be deployed and data may be collected to produce an image to identify objects or delineated interfaces. Based on the resultant reflected image, a decision can be made to change the antenna to vary the frequency. This decision is based on the quality of data received and the geological characteristics producing the reflections at the interface.

Alternatively, the antenna may be capable of varying the frequency it emits, for example either manually, or using automatic computation and processing. With a processor onboard coupled to the sleeve and antenna assembly, automated decisions can be made about the frequency to be used. This is done by comparing data of a single rotation or multiple rotations taken with different frequencies. Using this information, the processor can determine the optimal frequency to best identify the delineation interface or object based on its location. In use, the processor may select and/or adjust the frequency. If detected data indicate a high signal-to-noise ratio, the frequency can be increased and/or decreased until the noise-to-signal ratio is acceptable. The use of different frequencies can be achieved by either using a multi-frequency capable antenna, and/or equipping the radar tool with multiple antennas, some capable of VHF and some of UHF, and computationally determine which one or more of the antennae to activate and use.

The antenna captures data about the location of objects or delineated interfaces by rotating about its axis, and radially emitting and receiving waves. The ability to rotate the antenna and sleeve at different speeds is important when scanning in a radial configuration. Depending on the geological environment, different rotation speeds may be used to acquire data with variable sampling density. This is related to radial resolution, which depends on the dominant wavelength in the data and indicates the smallest radial distance along which two different features can be separately imaged. The wavelength, in turn, depends on the propagation velocity of electromagnetic waves. At a fixed frequency (e.g., typical narrowband borehole radar frequency), the main property impacting radial resolution is propagation velocity. The rotation speed is tailored to "fast" and "slow" geological settings (i.e., media with high and low electromagnetic wave propagation velocities, respectively), to properly survey radial data and generate high-resolution images. In "fast" media, the dominant wavelength is larger than in "slow" media. Therefore, higher data density is required in "slow" media, which in turn translates into higher rotation speeds.

One method of varying rotation speed is by physically rotating the drill string at a different speeds or manually setting a different rotation speed of the tool. When the tool is deployed and image data are retrieved, such data can be analyzed to identify objects or delineated interfaces. Based on the resultant reflected image, a decision can be made to change the radial rotation speed of the tool. This decision is based on the quality of data received and the geological characteristics producing the reflections at the interface.

A second method of varying the speed of rotation uses automatic computation and processing. With a processor, such as at surface or one onboard coupled to the sleeve and antenna assembly and/or survey instrumentation, automated decisions can be made about the operating radial rotation speed to be used. This is done by comparing data of a single rotation or multiple rotations taken with different radial rotation speeds. Using this information, the processor can determine the optimal radial rotation to best identify the delineation interface or object location. In use, the processor may select and/or adjust the speed of rotation. If detected data indicate a low signal-to-noise ratio (i.e., problematic noise issues), the speed can be reduced to allow more time for waves to be emitted and received by the antenna. If the detected data indicate a high signal-to-noise ratio, the speed can be increased to improve operational efficiency. The processed data and decision can be communicated to the operator and/or employed to directly control the speed of rotation, for example, the speed of rotation of surface equipment or the rpm of a downhole rotary driver, such as a motor, in the tool with the sleeve and antenna assembly.

Therefore, methods could include, for example, adjusting any one or more of the speed of rotation, the aperture's arc length, and the frequency of waves emitted. It is to be appreciated that, rather than a processor making these changes, it is also possible for an operator to review the data and make such decisions as to the configuration of the apparatus. Such configurations can be implemented automatically by the processor, manually by the operator, or both. Each of these configurations can be implemented independently or in combination with one another. Each can be implemented following a full 360° rotation, after a partial rotation (i.e., a rotation of less than 360°), and/or while rotating.

Figure 6A:
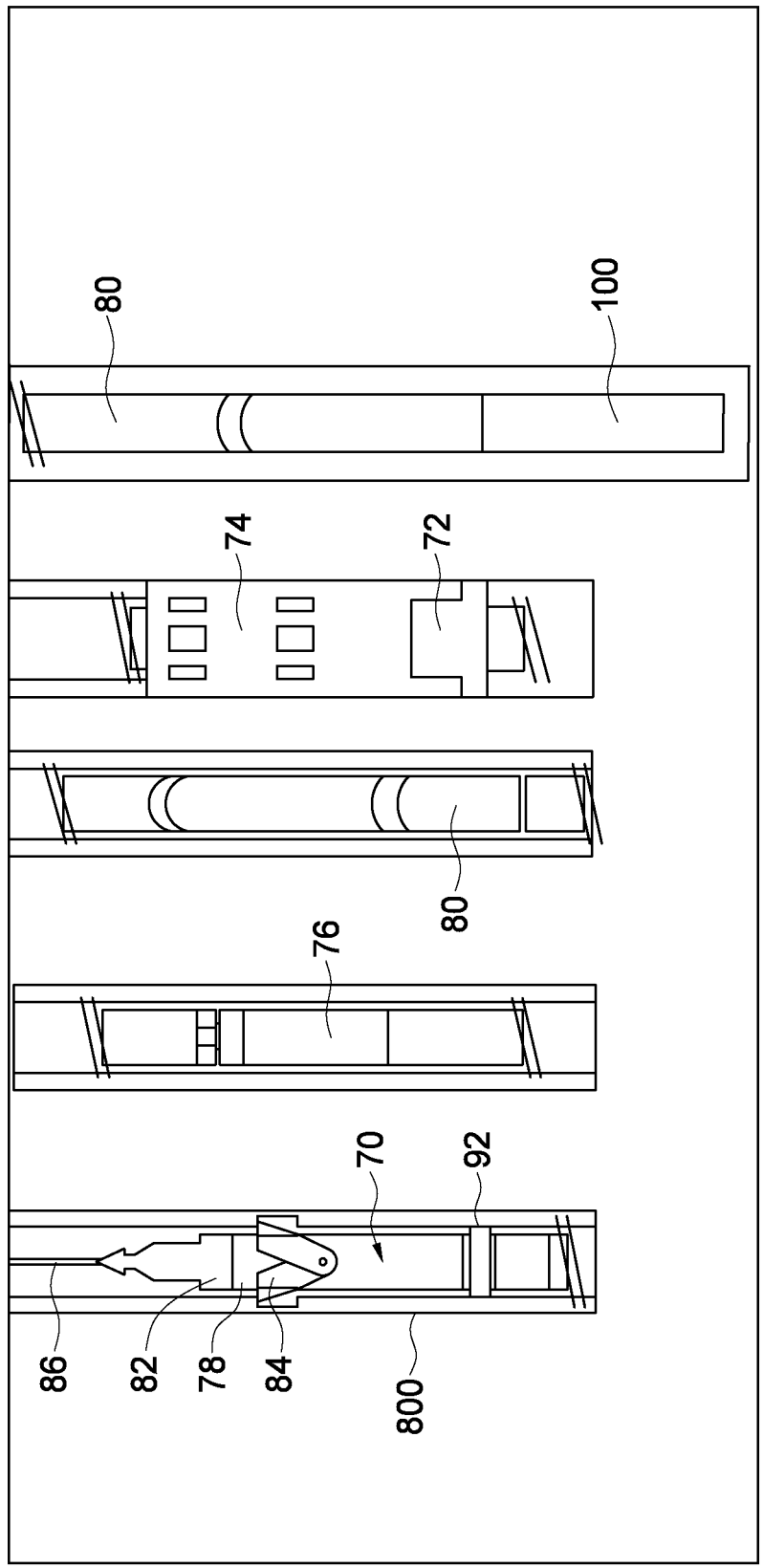
FIG. 6A is a schematic section through a borehole showing a drill string and a tool according to the present invention in the borehole.
Figure 6B:
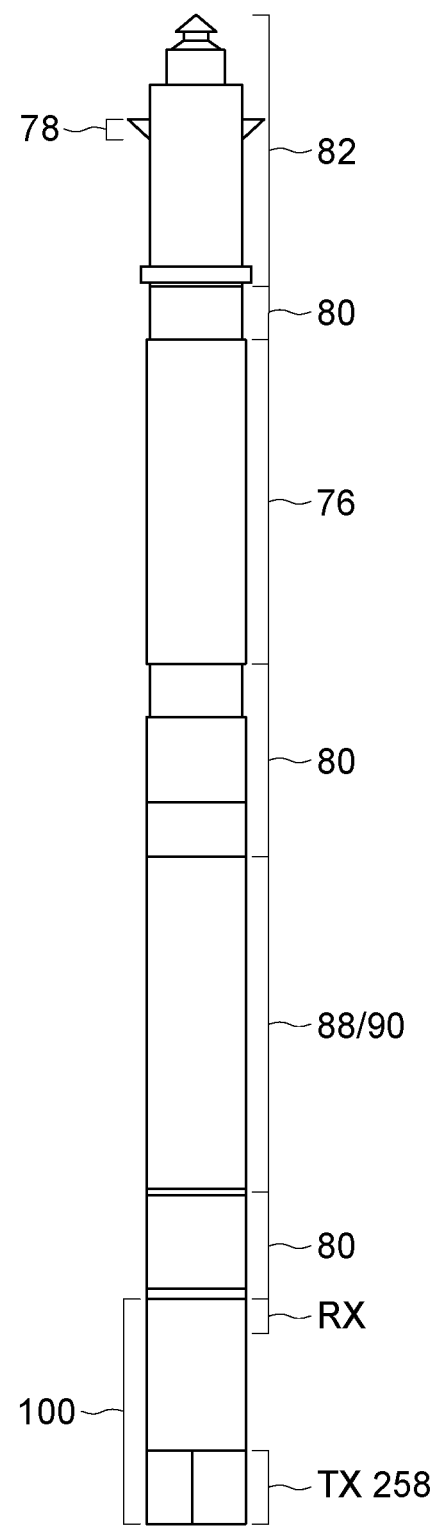
FIG. 6B is a side elevation of a tool according to the present invention.
Figure 7:
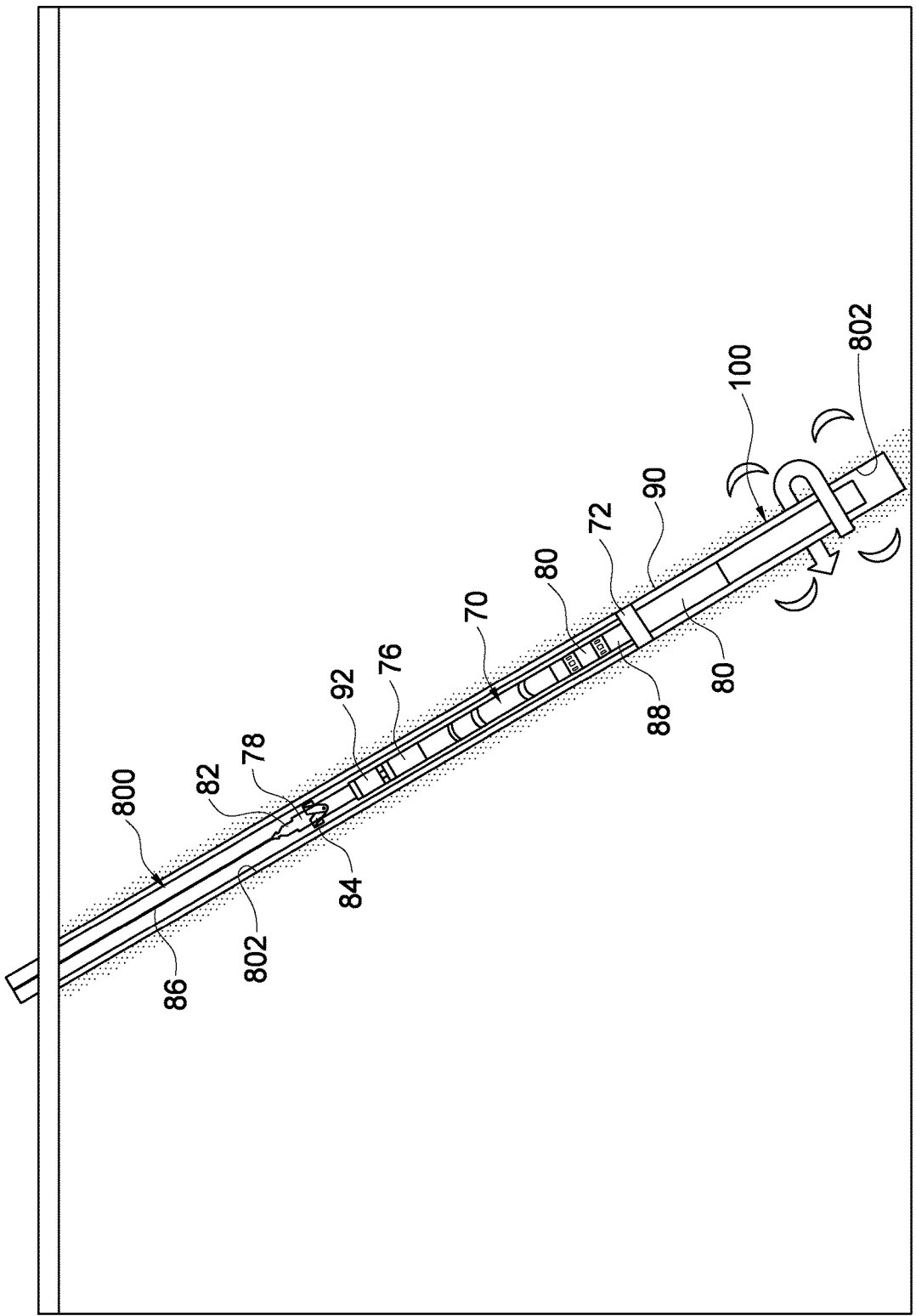
FIG. 7 is a section through a formation with a bore showing another tool according to the present invention installed therein.

With reference to FIGS. 6A, 6B and 7, the radar apparatus 100 can be incorporated in a tool 70 for downhole operation. In one embodiment, the tool is intended to be run into a borehole through a drill string 800. The drill string may be for example, one including a bottom hole assembly 806 of a coring bit 72 and a stabilizer 74 behind the coring bit. The tool is used to image the borehole by having its antenna apparatus 100 extended out through the coring bit opening. In operation, a centre portion of the coring bit may be removed from the drill string to open the end thereof. With reference also to FIGS. 8A-8D, the tool may then be run into the borehole through the drill string to protrude the antenna apparatus 100 out through the end of the drill string. As such, the entire tool is sized to fit into and be moveable through an inner bore of the drill string. In pilot hole drilling, a standard drill string may have an inner diameter of about 60 mm. This means that the entire tool 70 has an outer diameter no greater than about 58 mm. The opening in the coring bit is about 47 mm. Therefore, the protruding antennas and directional covers of apparatus 100 must have a maximum outer diameter that is less than about 46 mm to fit through a 47 mm diameter opening.

In one embodiment, the tool therefore includes the radar apparatus 100, including the antenna and its sleeve, at a first, lower end. In addition, the tool includes survey equipment 76, and a latching assembly 78 to latch the tool into the drill string. The radar apparatus 100, survey equipment 76, and latching assembly 78 are all coupled directly or indirectly into one elongate structure. In one embodiment, each of the parts 100, 76, 78 are coupled by adapter rods and connectors 80, such as for example with threaded ends or bolted connections, that permit the parts to be disconnected and reconnected such as may be useful for storage, repair or custom selection and combination of parts.

The survey equipment 76 may include one or more of a gyroscope, an accelerometer and a magnetometer for measuring one or more of movement, azimuth, pitch, and roll in a housing. If the survey equipment is in a portion of the tool within the drill string, in other words not protruding, during use, care may be taken ensure that the survey equipment can operate within the drill string, for example, surrounded by steel. At least the survey equipment and the radar apparatus, including the antenna and sleeve, are coupled together in a known orientation and rotationally fixed manner. In particular, the location of the aperture of the sleeve of apparatus 100 is rotationally known and fixed with respect to the survey equipment. This permits synchronized rotation of the survey instruments and radar apparatus and ensures that the azimuth, directional information, determined by the survey equipment is directly applicable to the radar data received from the antenna.

The latching assembly 78 may take various forms to secure the tool in the drill string. In one embodiment, the latching assembly is configured to secure the upper end 82 of the tool rotationally and axially fixed within drill string bore. The latching assembly may include one or more of splines, dogs, ears, etc. that are configured to catch in a latching area of the drill string. In one embodiment, for example, the latching assembly includes driveable or biased latching ears 84 that are driven or biased out into engagement with latching recesses such as slots or glands in the drilling string bore. The latching assembly may be selected to cooperate with an existing latching area in the drill string where the core bit removable section is landed and locked.

The tool may be powered by and communicate with surface via a wireline cable 86. The wireline cable may pass from the antenna all the way up through or alongside the tool and extend to surface from upper end 82. The wireline cable may also be employed to pull the tool to surface.

In addition or alternatively, tool 70 may include a battery 88 to provide onboard power and a processor and/or telemetry module 90 for onboard surface communication and processing. It may be useful to install module 90 on the portion of the tool that protrudes from the end of the drill string to avoid interference by the metal, steel, of the drill string. The telemetry module may include a wired and/or wireless communication apparatus.

As noted above, the antenna and survey equipment is rotated (arrow) to generate radial azimuth slices of radar data to give a 3-D image around the borehole. This can be done by latching in the tool and rotating the drill string, or as illustrated in FIG. 7, by including a rotary driver 92 in the tool. The rotary driver is positioned between survey equipment 76 and the latching mechanism 78. The rotary driver acts on the rigidly coupled survey equipment and apparatus 100 so that they are rotated together. In the illustrated tool, rotary driver 92 is a stepper motor. The stepper motor can have a variable speed such as between 1 and 10 rpm. The speed can be controlled on the fly as by control through the wireline cable 86 or via the processor module 90. Some parts of the tool such as survey equipment 76, battery 88 and module 90 may include waterproof enclosures. As noted above, the radar apparatus 100 can take various forms.

Figure 8A:
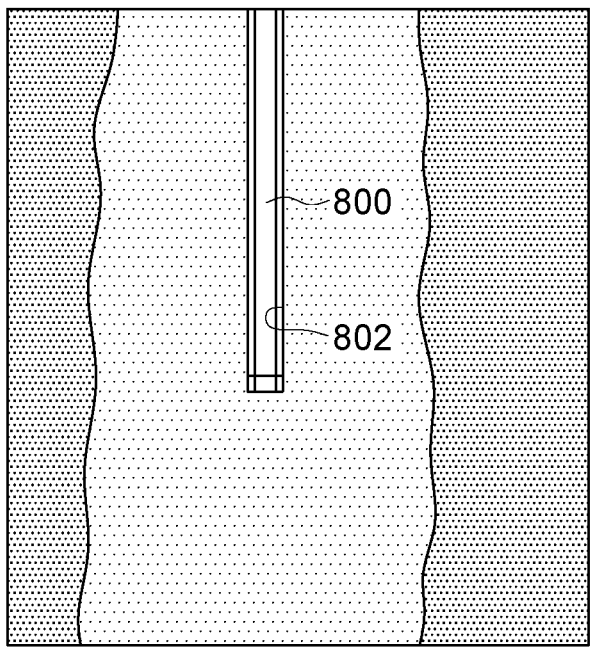
FIG. 8A to 8D are schematic illustrations through a formation while imaging a borehole, according to a method of the present invention.
Figure 8B:
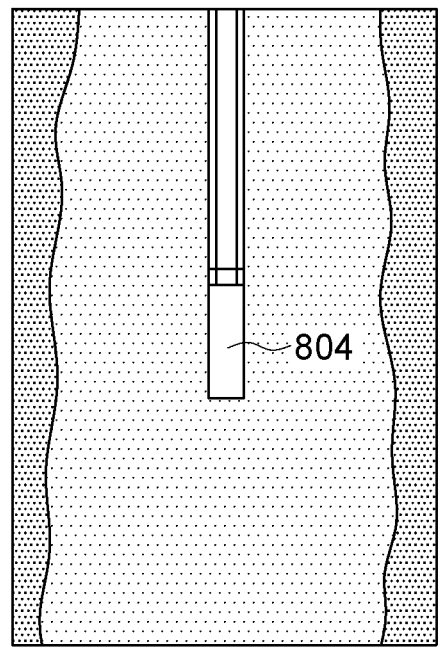
Figure 8C:
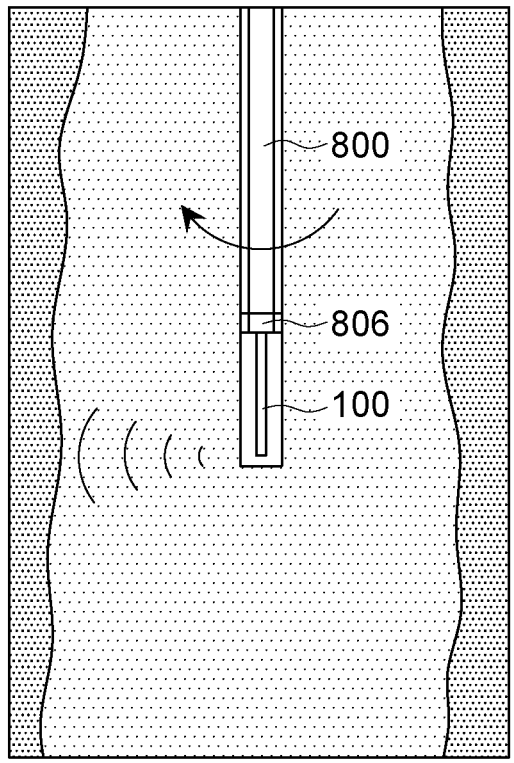
Figure 8D:
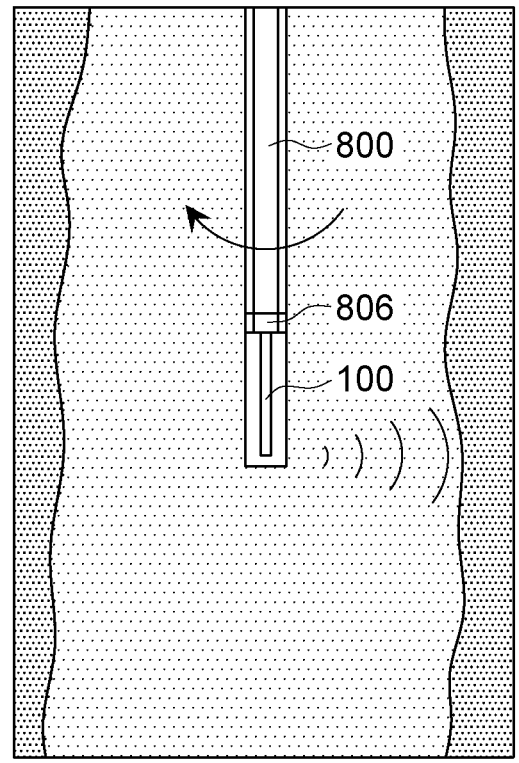

With reference to FIGS. 8A-8D, the apparatus 100 may be used according to the following method. A core tube (not shown) is tripped to surface while a drill string 800 remains in a borehole 802 being drilled (FIG. 8A). The drill string may be pulled back to create a space 804 between the drill string and the bottom hole, as shown in FIG. 8B. The apparatus 100 may be run into the hole through the drill string, for example on wireline, and the sleeve and antenna of the apparatus may be latched in a known and releasably locked rotational orientation relative to the drill string. The antenna and sleeve may be protruded from an end 806 of the drill string, as shown in FIGS. 7 and 8D. The antenna may be activated to transmit and receive waves to obtain data about the formation around the hole, which data may be recorded to a storage medium on the tool or communicated to surface.

The sleeve and antenna may be rotated about long axis $\chi$. For example, the string 800 may be rotated to rotate the apparatus 100. Alternatively, the sleeve and antenna may be coupled to a rotatable driver 92 that rotates the sleeve and antenna. Regardless, the apparatus, including antenna and the sleeve in which it is mounted, is rotated and for example at points in time alternately has the aperture pointing towards the formation to the left, shown in FIG. 8C, and to the right, shown in FIG. 8D. While rotating, the sleeve and antenna stay longitudinally stationary, in other words without moving along the length of the well. To image the near wellbore in all directions, a 3-D image may be computed and the derivative image in 3-D space may be calculated. One approach involves computing and collecting radar data (i.e. transmitting and receiving radar wave data) while the antenna apparatus is rotated about 360°, while the data are recorded against the reference azimuthal angles around the bore, so that the operator or processor can tell or compute not only the distance the detected object or interface is from the bore, but also the azimuthal direction to that object. Survey tools may record the orientation of the apparatus, specifically the direction the radar waves are being transmitted from the tool and/or being received by the antenna. Following this operation, the apparatus may be unlatched and tripped to surface and the core tube may be reinstalled.

Figure 9:
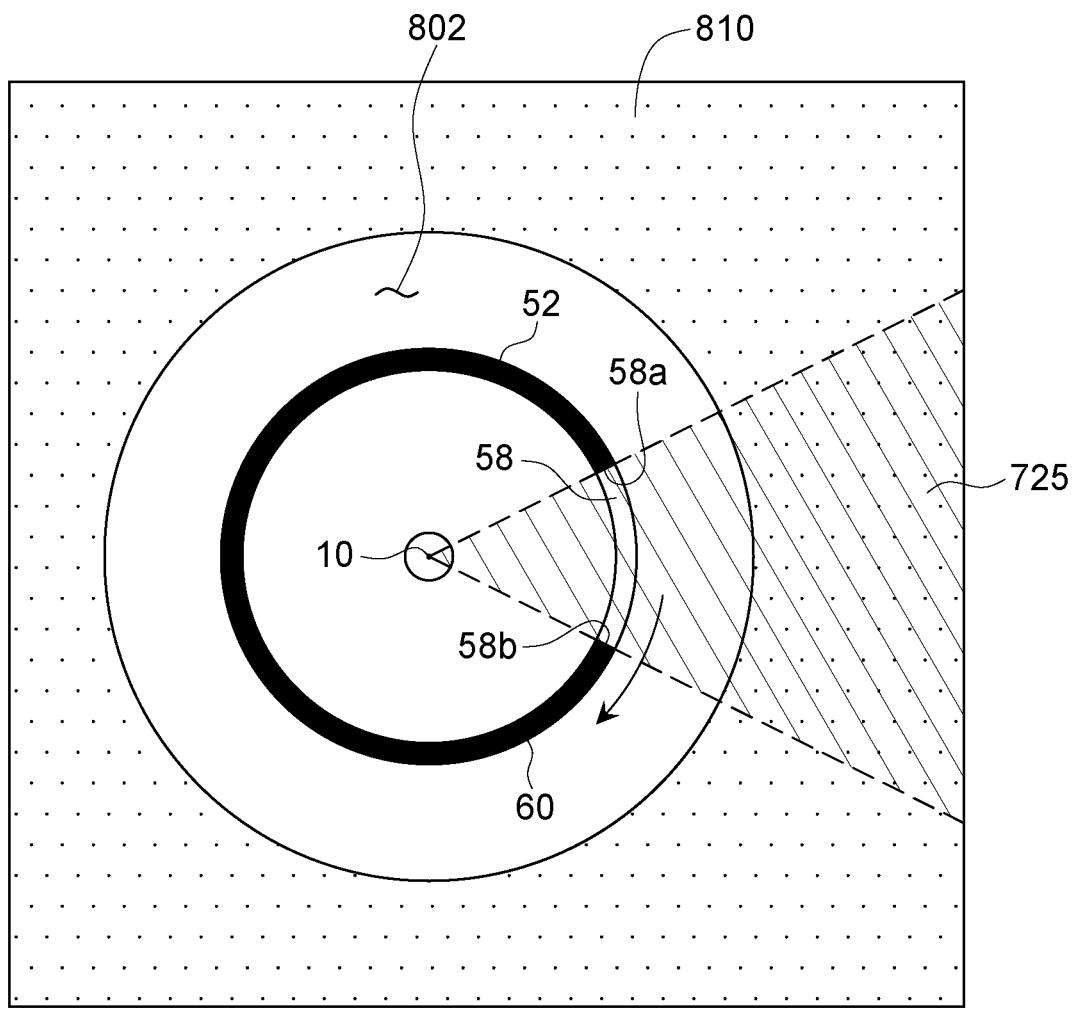
FIG. 9 is a schematic illustration for explaining initial data collection as a series of azimuthal slices.

In use, data may be collected as a series of azimuthal slices 725. In this illustrative example, FIG. 9 shows an azimuthal slice 725. As the device rotates (arrow), the azimuthal slice moves, and therefore data about a different part of the surrounding formation 810 are being collected. Put another way, the azimuthal slice is an area illuminated by the antenna, and as the azimuthal slice sweeps 360° around from a longitudinal position in the borehole, data in an area orthogonal to the long axis of the borehole are collected pertaining to the illuminated area. The data collection method may be continuous such that each subsequent azimuthal slice 725 may overlap with the previous one, so that data pertaining to shared areas from different perspectives can be compared.

Figure 10:
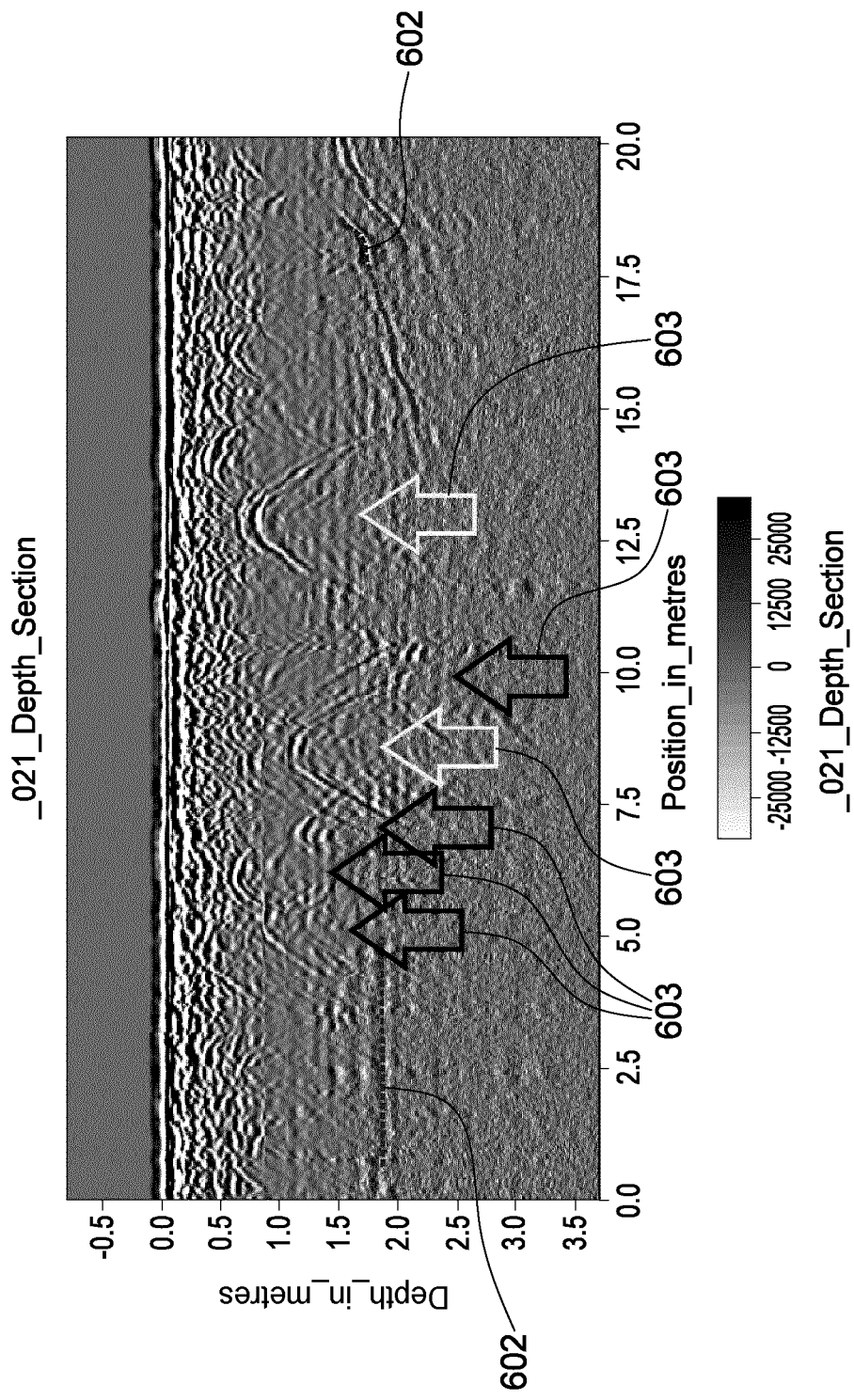
FIG. 10 is a conventional radargram generated using an antenna that, for each subsequent trace, moves linearly with respect with respect to a surface feature.

Radar data can be interpreted in a number of ways. Referring to FIG. 10, a typical radargram is shown, illustrating two types of features typically seen in radargrams. Dashed lines 602 show linear alignment of reflectors from a long interface, which is typical for geological contacts, such as the soil-bedrock contact, contacts between different rock formations, vein contacts, and water tables. Arrows 603 show hyperbolic alignment of reflectors from a short or point reflector, that typically occur due to buried objects (e.g., boulders, pipes, land mines) or from ends of linear interfaces, such as the ends of a defined vein. Both of these radargram feature interpretations rely on the fact that for each subsequent trace, the antenna has moved linearly with respect to the position of the subsurface feature, and the reflections will either line up linearly or form a characteristic hyperbola.

Again with reference to FIGS. 8A-8D, the rotating, or "lighthouse", method of operating the antenna and sleeve does not produce the same types of linear and hyperbolic features as the conventional borehole radargram shown in FIG. 10, since the antenna is not moving linearly along the borehole. Reflections from geologic interfaces or buried objects will only have alignment and/or coherence over a short angular rotation interval, which may vary depending on the distance to the interface. Therefore, in an embodiment where a directionally configured antenna is maintained linearly fixed, and rotated about its axis, another interpretation method must be used. This method applies whether the antenna is configured directionally by a sleeve with RAM as described above or otherwise.

Figure 11:
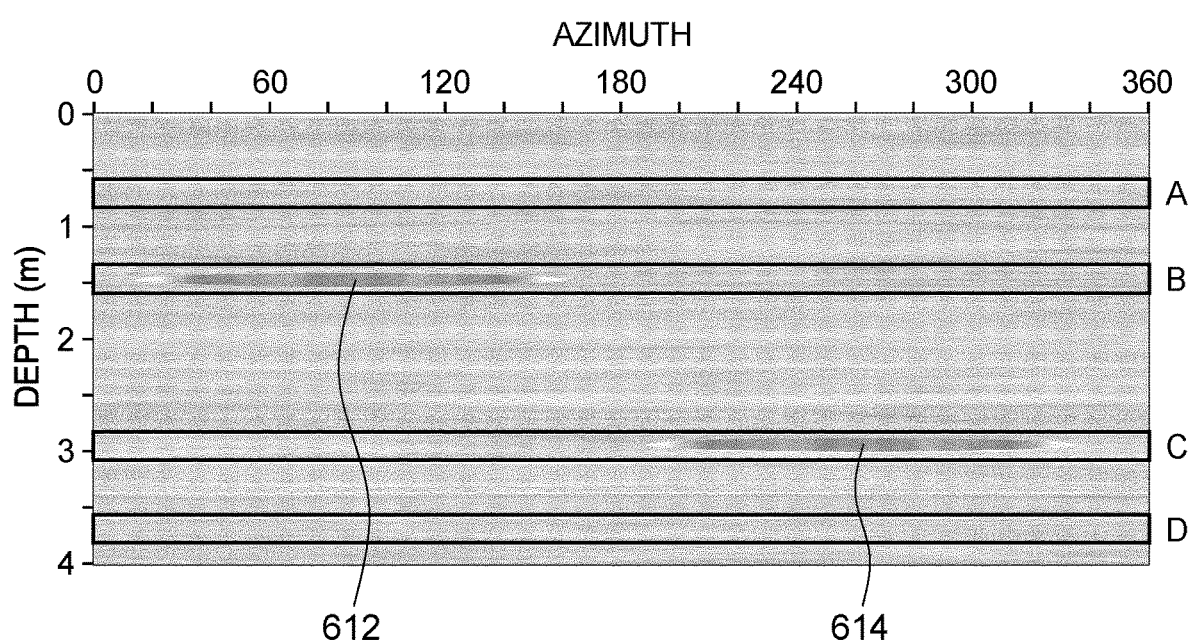
FIG. 11 is a linear radargram generated using one embodiment of the present invention.

With reference to FIG. 11, a linear radargram is shown with the vertical axis denoting distance from the radar antenna and the horizontal axis denoting radial direction. Note that this departs from a conventional linear radargram, in which the horizontal axis usually denotes linear antenna distance. The highest amplitude detected is indicated at the centre of target features 612 and 614. In FIG. 11, target feature 612 was detected approximately 60° to 120° azimuth and 1.5 m (box B) from the antenna, and target feature 614 was detected at approximately 240° to 300° azimuth and 3 m (box C) from the antenna. No features were detected at either of distances of about 0.6 m (box A), or about 4.6 m (box D), from the antenna.

Figure 12:
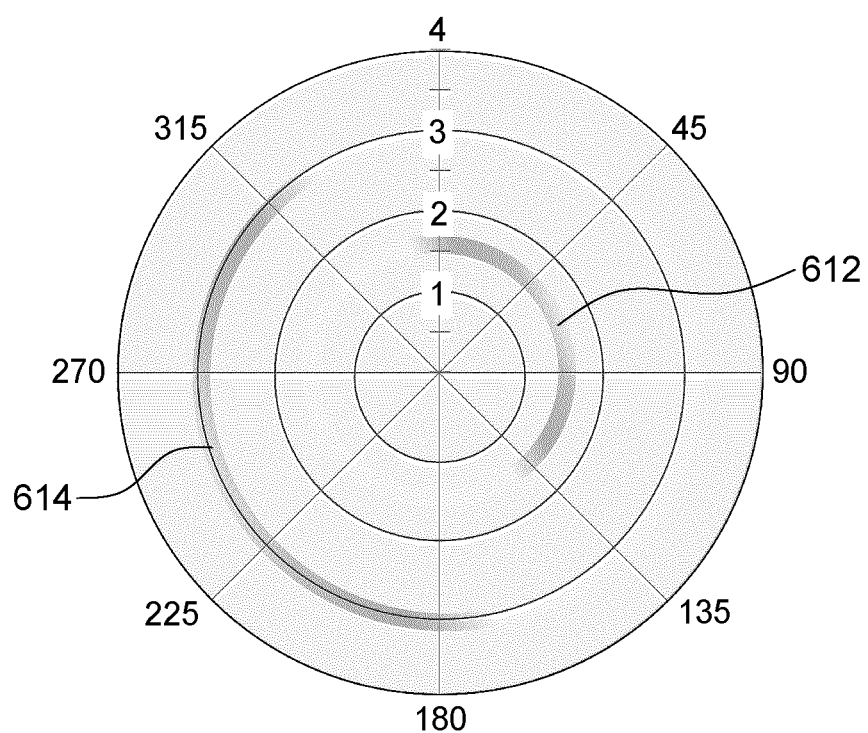
FIG. 12 is a radar plot showing an alternative representation of the data of FIG. 11.

With reference to FIG. 12, a radar plot of the same features as FIG. 11 shows signal amplitudes plotted as a function of azimuth and distance from the antenna. Targets 612 and 614 are illustrated as semicircular rings and the target ranging is found by measuring the azimuth of, and radial distance to, the highest amplitude of each target reflection. This method is useful for finding both the direction and distance to the target from the antenna. Estimated direction may be less accurate the greater the distance between the target and the antenna, which is exaggerated at greater radial distance from the borehole.

With reference to FIG. 13, radial depth slices are generated by taking depth slices through the radar data, which are representations of the data in all directions at a specific depth (or distance) from the antenna. In other words, amplitudes of detected waves are plotted as a function of the radial position of the sleeve. In the context of radial depth slices, "depth" refers to the distance from the antenna to the target measured orthogonally from the antenna assembly, and "slice" refers to the shape of the depth data plotted as a function of azimuth (as shown in FIG. 13A). Each radial depth slice is a graphical representation of the amplitude data detected by the antenna at each azimuth for a given depth. The depth or range of depths may be selected for the given application.

In the illustrative example of FIGS. 13A-13D, data are collected for each of four depths by the antenna during a 360° sweep. In each of FIGS. 13A-13D, a radial depth slice is shown on a plot that has two axes: (i) an orbital axis measuring from 0° to 360°, corresponding to the azimuthal position of the aperture, and (ii) a radial axis, with longer lengths from the origin indicating higher amplitudes of detected radar waves. A radial depth slice, therefore, illustrates the different amplitudes detected at every azimuthal direction at a specific range of depth (or distance) from the antenna.

The same data are used as in FIGS. 11-12. The radar data are then converted to all positive amplitudes, for example by using absolute values or root-mean-squares of the amplitudes, and summed at each azimuth. Positive values are used since alternating polarities can indicate the targets in the opposite direction or cancel out the reflection amplitudes. These amplitude data are then plotted on a radial chart with the amplitudes given as distance from the centre of the plot. In each of FIGS. 13A-13D, a radial depth slice is shown (616a, 616b, 616c, and 616d, respectively), corresponding to boxes A-D in FIG. 11.

Figure 13A:
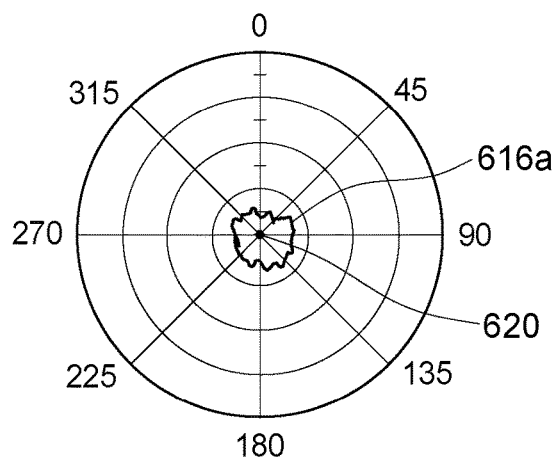
FIGS. 13A to 13D are radar plots showing radar depth slices generated by taking slices of data in all directions at a specific range of depths (or distances) from the antenna according to one embodiment of the present invention.
Figure 13B:
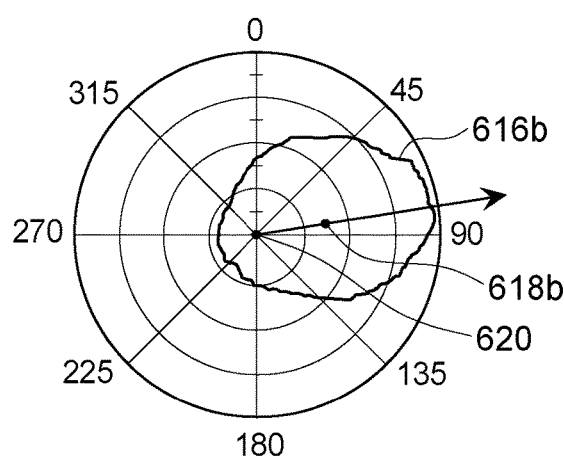

In FIG. 13A, radial depth slice 616a resembles a circle centred around an origin 620 of the figure, which represents the location of the antenna. Such a slice indicates that no reflector was detected. In FIG. 13B, radial depth slice 616b resembles an oval with a centre point 618b away from the origin. That the centre point is away from the origin indicates that a reflector is present. A direction (arrow) from the origin 620 to the centre point 618b indicates the direction of the reflector, and this information combined with the depth being analyzed can be used to identify the location of the reflector.

Figure 13C:
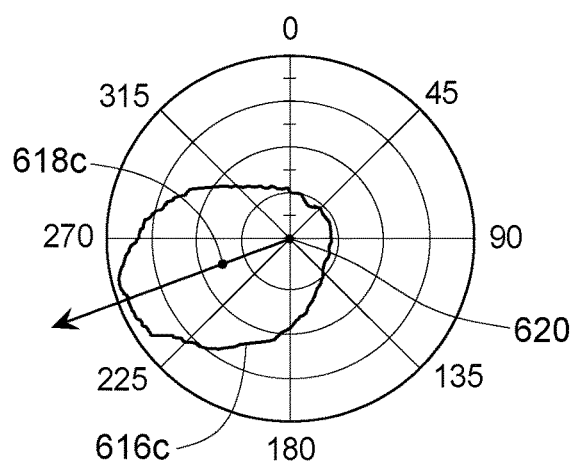
Figure 13D:
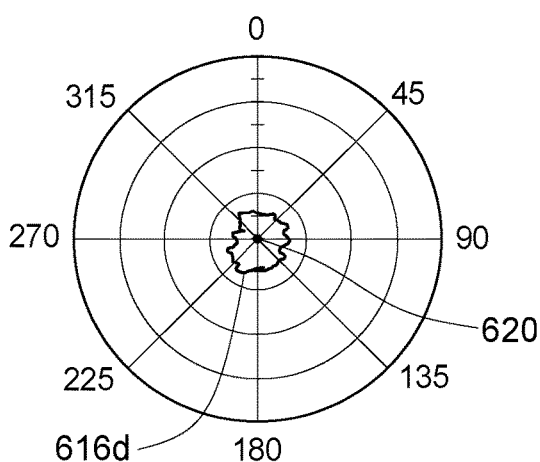

As with FIG. 13A, FIG. 13D illustrates radial depth slice 616d centred around the origin, which indicates that no reflector was detected at this depth. As with FIG. 13B, FIG. 13C illustrates radial depth slice 616c with a centre point 618c away from the origin, indicating that a reflector is present in the direction (arrow) from the origin 620 to the centre point 616c.

Any of the interpretation methods described in reference to FIGS. 11, 12, and 13A-13D, may be supported by semi-automatic and/or automatic feature recognition. This may reduce the need for a human involvement in such operations. For example, artificial intelligence methods may be used to highlight the interfaces using advanced pattern recognition, for example to those patterns described in reference to FIGS. 11, 12, and 13. Semi-variogram and related geostatistical analysis methods may also be used to determine the direction of the strongest reflected signals.

An embodiment of an antenna and radar-reflective sleeve assembly similar to that described hereinabove with reference to FIGS. 1A and 1B was compared to an embodiment of the antenna and radar-absorbent sleeve assembly. Comparable levels of directionality achieved by the reflective embodiment were achieved using the absorbent embodiment having a 4 mm, or less, layer of RAM, for example a 1 mm layer of RAM. Referring to FIGS. 1A and 3A, this permits a radius δ' of the radar-absorbent embodiment to be greatly reduced compared to radius δ of the radar-reflective embodiment. For example, using a 500 MHz antenna, the antenna having a diameter of 38 mm, the radar-reflective embodiment would need a radius δ of 5 cm to 7.5 cm, whereas the radius δ' of the radar-absorbent embodiment was reduced to 23 mm. Advantageously, this would permit the radar-absorbent embodiment to fit through the standard 23.8 mm radius of a coring bit of an NQ core drilling system.

CLAUSES

Clause 1. An apparatus for ground penetrating radar, comprising: a sleeve for absorbing radar waves, the sleeve including a body that is elongate, hollow, and cylindrical, the body having an interior cavity for accommodating an antenna, the body including a radar-absorbent material; and an aperture, free of radar-absorbent material, extending along an axis of the sleeve for permitting radar waves to pass into and out of the sleeve.

Clause 2. The apparatus of any one or more of clauses 1-42, further comprising: the antenna disposed within the body of the sleeve, the antenna being for transmitting and receiving radar waves.

Clause 3. The apparatus of any one or more of clauses 1-42, further comprising: a rotatable driver coupled to the sleeve, the rotatable driver configured to rotate the sleeve about the axis of the sleeve.

Clause 4. The apparatus of any one or more of clauses 1-42, wherein: the antenna is a non-directional antenna.

Clause 5. The apparatus of any one or more of clauses 1-42, wherein: the antenna is a weakly-directional antenna.

Clause 6. The apparatus of any one or more of clauses 1-42, further comprising: a processor coupled to the antenna.

Clause 7. The apparatus of any one or more of clauses 1-42, further comprising: a storage medium coupled to the processor.

Clause 8. The apparatus of any one or more of clauses 1-42, wherein: the body has an annular cavity therein for containing the radar-absorbent material.

Clause 9. The apparatus of any one or more of clauses 1-42, wherein: the body is made of the radar-absorbent material.

Clause 10. The apparatus of any one or more of clauses 1-42, wherein: the sleeve includes a coupling for removable connection with the antenna.

Clause 11. The apparatus of any one or more of clauses 1-42, wherein: the aperture has an arc length that extends from 10° to 180° around a circumference of the sleeve.

Clause 12. The apparatus of any one or more of clauses 1-42, wherein: an arc length of the aperture is adjustable.

Clause 13. The apparatus of any one or more of clauses 1-42, wherein: the body of the sleeve includes a shutter, the shutter having a c shape in radial cross section, the shutter being rotatable about its axis to vary an arc length of the aperture.

Clause 14. The apparatus of any one or more of clauses 1-42, wherein: the aperture is defined by a spacer positioned within the sleeve, the spacer being made of a non-radar-absorbent material that permits radar waves to pass into and out of the sleeve.

Clause 15. The apparatus of any one or more of clauses 1-42, wherein: the non-radar-absorbent material includes polyethylene foam.

Clause 16. The apparatus of any one or more of clauses 1-42, wherein: the body includes a first axial length and a second axial length; and the aperture extends along the first axial length.

Clause 17. The apparatus of any one or more of clauses 1-42, wherein: the second axial length is made of a non-radar-absorbent material such that radar waves can pass into and out of the second axial length.

Clause 18. The apparatus of any one or more of clauses 1-42, wherein: the antenna has a receiver portion and an emitter portion.

Clause 19. The apparatus of any one or more of clauses 1-42, wherein: the receiver portion is disposed within the first axial length, and the transmitter portion is disposed within the second axial length.

Clause 20. The apparatus of any one or more of clauses 1-42, wherein: the receiver portion is disposed within the second axial length, and the transmitter portion is disposed within the first axial length.

Clause 21. The apparatus of any one or more of clauses 1-42, further comprising: a reflective material coating radially outwardly of the radar-absorbent material.

Clause 22. The apparatus of any one or more of clauses 1-42, further comprising: a visible indicator positioned on an exterior of the sleeve to indicate an axial position the aperture therewithin.

Clause 23. The apparatus of any one or more of clauses 1-42, further comprising: a visible indicator positioned on an exterior of the sleeve to indicate an arc length of the aperture therewithin.

Clause 24. The apparatus of any one or more of clauses 1-42, further comprising: a visible indicator positioned on an exterior of the sleeve to indicate an axial position and an arc length of the aperture therewithin.

Clause 25. The apparatus of any one or more of clauses 1-42, further comprising: at least one survey instrument coupled to the sleeve, the at least one survey instrument being for determining an orientation of the aperture relative to the axis of the sleeve.

Clause 26. The apparatus of any one or more of clauses 1-42, wherein: the at least one survey instrument includes an accelerometer.

Clause 27. The apparatus of any one or more of clauses 1-42, wherein: the at least one survey instrument includes a magnetometer.

Clause 28. The apparatus of any one or more of clauses 1-42, wherein: the at least one survey instrument includes a gyroscope.

Clause 29. A method for configuring a radar imaging apparatus to support directional data capture, the method comprising: positioning a sleeve around the radar apparatus, the sleeve including a wall configured to absorb radar waves and including an aperture through the wall for permitting radar waves to pass through.

Clause 30. A method for surveying a formation using ground penetrating radar, comprising: positioning a directionally configured antenna in a borehole; rotating the directionally configured antenna about a long axis of the directionally configured antenna; maintaining the directionally configured antenna longitudinally stationary; emitting waves from the directionally configured antenna; receiving waves via the directionally configured antenna; and recording data, including amplitude data of waves received by the directionally configured antenna, and position data of a rotational position of the directionally configured antenna.

Clause 31. The method of any one or more of clauses 1-42, further comprising: processing the data.

Clause 32. The method of any one or more of clauses 1-42, wherein: processing includes at least one of dewowing the data, filtering the data, gaining the data, and converting amplitudes of amplitude data to positive values.

Clause 33. The method of any one or more of clauses 1-42, wherein: processing includes identifying anomalies in the data.

Clause 34. The method of any one or more of clauses 1-42, wherein: processing includes identifying a signal-to-noise ratio of the data.

Clause 35. The method of any one or more of clauses 1-42, wherein: processing includes comparing the data to previously-processed data.

Clause 36. The method of any one or more of clauses 1-42, further comprising: adjusting an arc length of the aperture.

Clause 37. The method of any one or more of clauses 1-42, further comprising: adjusting a frequency emitted by the antenna.

Clause 38. The method of any one or more of clauses 1-42, further comprising: adjusting a speed at which the antenna and sleeve are rotated.

Clause 39. The method of any one or more of clauses 1-42, further comprising: generating a radial plot of the data, wherein amplitude data are plotted as a function of position data.

Clause 40. An apparatus for ground penetrating radar, comprising: an antenna assembly including a sleeve for absorbing radar waves, the sleeve including a body that is elongate, hollow, and cylindrical, the body having an interior cavity, the body including a radar-absorbent material, and an aperture extending along an axis of the sleeve for permitting radar waves to pass into and out of the sleeve; an antenna disposed within the body of the sleeve, the antenna being for transmitting and receiving radar waves; at least one survey instrument coupled to the antenna assembly, the at least one survey instrument being for determining an orientation of the aperture in space; and a latching assembly for latching the apparatus to a drill string; and the antenna assembly, the at least one survey instrument, and the latching assembly being coupled into an elongate structure.

Clause 41. The apparatus of any one or more of clauses 1-42, further comprising: a processor coupled to the antenna.

Clause 42. The apparatus of any one or more of clauses 1-41, further comprising: a rotatable driver coupled to the sleeve, the rotatable driver configured to rotate the sleeve about the axis of the sleeve.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims. No claim element is to be construed under the provisions of 35 USC 112, sixth paragraph, unless the element is expressly recited using the phrase "means for" or "step for".

The invention claimed is:

1. An apparatus for ground penetrating radar, comprising:
a sleeve for absorbing radar waves, the sleeve including
a body that is elongate, hollow, and cylindrical, the body having an interior cavity for accommodating an antenna, the body including a radar-absorbent material;
an aperture, free of radar-absorbent material, extending along an axis of the sleeve for permitting radar waves to pass into and out of the sleeve; and
a visible indicator positioned on an exterior of the sleeve to indicate an axial position of the aperture therewithin.

2. The apparatus of claim 1, further comprising:
the antenna disposed within the body of the sleeve, the antenna being for transmitting and receiving radar waves.

3. The apparatus of claim 2, wherein: the antenna is a non-directional antenna.

4. The apparatus of claim 2, wherein: the antenna is a weakly-directional antenna.

5. The apparatus of claim 2, wherein: the sleeve includes a coupling for removable connection with the antenna.

6. The apparatus of claim 1, further comprising:
a rotatable driver coupled to the sleeve, the rotatable driver configured to rotate the sleeve about the axis of the sleeve.

7. The apparatus of claim 1, further comprising: a processor coupled to the antenna.

8. The apparatus of claim 7, further comprising: a storage medium coupled to the processor.

9. The apparatus of claim 1, wherein: the body has an annular cavity therein for containing the radar-absorbent material.

10. The apparatus of claim 1, wherein: the body is made of the radar-absorbent material.

11. The apparatus of claim 1, wherein: the aperture has an arc length that extends from 10° to 180° around a circumference of the sleeve.

12. The apparatus of claim 1, wherein: an arc length of the aperture is adjustable.

13. The apparatus of claim 1, wherein:
the body of the sleeve includes a shutter, the shutter having a c shape in radial cross section, the shutter being rotatable about its axis to vary an arc length of the aperture.

14. The apparatus of claim 1, wherein:
the aperture is defined by a spacer positioned within the sleeve, the spacer being made of a non-radar-absorbent material that permits radar waves to pass into and out of the sleeve.

15. The apparatus of claim 14, wherein: the non-radar-absorbent material includes polyethylene foam.

16. The apparatus of claim 1, further comprising: a reflective material coating radially outwardly of the radar-absorbent material.

17. An apparatus for ground penetrating radar, comprising:
an antenna including a receiver portion and an emitter portion;
a sleeve for absorbing radar waves, the sleeve including:
a body that is elongate, hollow, and cylindrical, the body having an interior cavity for accommodating the antenna, the body including a radar-absorbent material and the body including a first axial length and a second axial length, wherein the second axial length is made of a non-radar-absorbent material such that radar waves can pass into and out of the second axial length; and an aperture, free of radar-absorbent material, extending along an axis of the sleeve for permitting radar waves to pass into and out of the sleeve, the aperture extending along the first axial length;

wherein: the receiver portion of the antenna is disposed within the first axial length, and the transmitter portion of the antenna is disposed within the second axial length.

18. An apparatus for ground penetrating radar, comprising:

an antenna including a receiver portion and an emitter portion;

a sleeve for absorbing radar waves, the sleeve including:
 a body that is elongate, hollow, and cylindrical, the body having an interior cavity for accommodating the antenna, the body including a radar-absorbent material and the body including a first axial length and a second axial length, wherein the second axial length is made of a non-radar-absorbent material such that radar waves can pass into and out of the second axial length; and
 an aperture, free of radar-absorbent material, extending along an axis of the sleeve for permitting radar waves to pass into and out of the sleeve, the aperture extending along the first axial length, wherein: the receiver portion of the antenna is disposed within the second axial length, and the transmitter portion of the antenna is disposed within the first axial length.

19. An apparatus for ground penetrating radar, comprising:

a sleeve for absorbing radar waves, the sleeve including
 a body that is elongate, hollow, and cylindrical, the body having an interior cavity for accommodating an antenna, the body including a radar-absorbent material;
 an aperture, free of radar-absorbent material, extending along an axis of the sleeve for permitting radar waves to pass into and out of the sleeve; and
 further comprising: a visible indicator positioned on an exterior of the sleeve to indicate an arc length of the aperture therewithin.

20. The apparatus of claim 19, wherein the visible indicator additionally indicates an axial position of the aperture therewithin.

21. An apparatus for ground penetrating radar, comprising:

a sleeve for absorbing radar waves, the sleeve including
 a body that is elongate, hollow, and cylindrical, the body having an interior cavity for accommodating an antenna, the body including a radar-absorbent material;
 an aperture, free of radar-absorbent material, extending along an axis of the sleeve for permitting radar waves to pass into and out of the sleeve; and
at least one survey instrument coupled to the sleeve, the at least one survey instrument being for determining an orientation of the aperture relative to the axis of the sleeve.

22. The apparatus of claim 21, wherein: the at least one survey instrument includes an accelerometer.

23. The apparatus of claim 21, wherein: the at least one survey instrument includes a magnetometer.

24. The apparatus of claim 21, wherein: the at least one survey instrument includes a gyroscope.

25. An apparatus for ground penetrating radar, comprising:

an antenna assembly including a sleeve for absorbing radar waves, the sleeve including
 a body that is elongate, hollow, and cylindrical, the body having an interior cavity, the body including a radar-absorbent material, and
 an aperture extending along an axis of the sleeve for permitting radar waves to pass into and out of the sleeve;
an antenna disposed within the body of the sleeve, the antenna being for transmitting and receiving radar waves;
at least one survey instrument coupled to the antenna assembly, the at least one survey instrument being for determining an orientation of the aperture in space; and
a latching assembly for latching the apparatus to a drill string; and
the antenna assembly, the at least one survey instrument, and the latching assembly being coupled into an elongate structure.

26. The apparatus of claim 25, further comprising: a processor coupled to the antenna.

27. The apparatus of claim 25, further comprising: a rotatable driver coupled to the sleeve, the rotatable driver configured to rotate the sleeve about the axis of the sleeve.

* * * * *